(12) United States Patent
Jared et al.

(10) Patent No.: US 6,208,771 B1
(45) Date of Patent: Mar. 27, 2001

(54) METHODS AND APPARATUS FOR ROBUST DECODING OF GLYPH ADDRESS CARPETS

(75) Inventors: David A. Jared, Sunnyvale; L. Noah Flores, Soquel; David L. Hecht, Palo Alto; Richard G. Stearns, Felton; Kenneth H. P. Chang, Foster City, all of CA (US)

(73) Assignee: Xerox PARC

( * ) Notice: Subject to any disclaimer, the term of this patent is extended or adjusted under 35 U.S.C. 154(b) by 0 days.

(21) Appl. No.: 09/144,518

(22) Filed: Aug. 31, 1998

Related U.S. Application Data

(63) Continuation-in-part of application No. 08/772,158, filed on Dec. 20, 1996.

(51) Int. Cl.$^7$ .............................. G06K 9/54; G06K 9/36; G06K 19/06; G06K 9/80

(52) U.S. Cl. .................. 382/306; 382/232; 235/494; 235/462.1

(58) Field of Search .................................. 382/289, 306, 382/232; 235/494, 456, 487, 454, 462, 462.1; 358/403

(56) References Cited

U.S. PATENT DOCUMENTS

| | | | |
|---|---|---|---|
| 5,168,147 | * 12/1992 | Bloomberg | 235/456 |
| 5,449,895 | * 9/1995 | Hecht et al. | 235/494 |
| 5,565,669 | * 10/1996 | Liu | 235/462 |
| 5,572,010 | * 11/1996 | Petrie | 235/494 |
| 5,576,532 | * 11/1996 | Hecht | 235/494 |
| 5,600,121 | 2/1997 | Kahn et al. | 235/472 |
| 5,742,041 | * 4/1998 | Liu | 235/462 |

OTHER PUBLICATIONS

Smart paper, SmartPaper Toolkit Overview, Xerox Corporation, 1994.*
The Anoto Pen—Technical Description (2 pages) as printed from the Internet, May 16, 1000.

(List continued on next page.)

*Primary Examiner*—Thomas D. Lee
*Assistant Examiner*—Wenpeng Chen
(74) *Attorney, Agent, or Firm*—Finnegan, Henderson, Farabow, Garrett & Dunner, L.L.P.

(57) ABSTRACT

A captured image includes a portion of a set of two-dimensional address codes. The portion of address codes can be decoded to determine a discrete pointer uniquely defining the portion. The captured image is first processed to determine the orientation of the portion, and then decoded based on the orientation to determine the discrete pointer. To determine the orientation of the portion, the portion is first analyzed to determine values at discrete locations within the portion. The values at each location form a matrix of binary data. The values of the matrix are then correlated to determine an orientation of the captured portion of two dimensional address codes. After determining the orientation of the portion, the values can be further analyzed to determine a discrete pointer that identifies the location of the portion within the address space defined by the two-dimensional address codes.

48 Claims, 30 Drawing Sheets

OTHER PUBLICATIONS

The Anoto Pen—Technical Pattern (2 pages) as printed from the Internet, May 16, 2000.

The Anoto Pen—The Pen (2 pages) as printed from the Internet, May 16, 2000.

The Anoto Pen—The Infrastructure (2 pages) as printed from the Internet, May 16, 2000.

The Anoto Pen—White Paper (4 pages) as printed from the Internet, May 16, 2000.

"Anoto Technology Takes Pen and Paper into the Digital Age" as printed from the Internet, May 16, 2000.

Rekimoto, J., "Pick–and–Drop: A Direct Manipulation Technique for Multiple Computer Environments," Proceedings of the ACM Symposium on User Interface Software and Technology, Oct. 14–17, 1997, pp. 31–39.

Rekimoto, J., "A Multiple Device Approach for Supporting Whiteboard–based Interactions," CHI 98, pp. 344–351, Apr. 1998.

Arai, T., et al., "PaperLink: A Technique for Hyperlinking from Real Paper to Electronic Content," CHI 97 Electronic Publications: Papers, Mar. 22–27, 1997 (13 pages).

* cited by examiner

| X00 | X01 | X02 | X03 | X04 | X05 | X06 | X07 | X08 | X09 | X0A | X0B | X0C | X0D | X0E | X0F | X10 |
|---|---|---|---|---|---|---|---|---|---|---|---|---|---|---|---|---|
| Y00 | Y01 | Y02 | Y03 | Y04 | Y05 | Y06 | Y07 | Y08 | Y09 | Y0A | Y0B | Y0C | Y0D | Y0E | Y0F | Y10 |
| X00 | X01 | X02 | X03 | X04 | X05 | X06 | X07 | X08 | X09 | X0A | X0B | X0C | X0D | X0E | X0F | X10 |
| YFF | Y00 | Y01 | Y02 | Y03 | Y04 | Y05 | Y06 | Y07 | Y08 | Y09 | Y0A | Y0B | Y0C | Y0D | Y0E | Y0F |
| X00 | X01 | X02 | X03 | X04 | X05 | X06 | X07 | X08 | X09 | X0A | X0B | X0C | X0D | X0E | X0F | X10 |
| YFE | YFF | Y00 | Y01 | Y02 | Y03 | Y04 | Y05 | Y06 | Y07 | Y08 | Y09 | Y0A | Y0B | Y0C | Y0D | Y0E |
| X00 | X01 | X02 | X03 | X04 | X05 | X06 | X07 | X08 | X09 | X0A | X0B | X0C | X0D | X0E | X0F | X10 |
| YFD | YFE | YFF | Y00 | Y01 | Y02 | Y03 | Y04 | Y05 | Y06 | Y07 | Y08 | Y09 | Y0A | Y0B | Y0C | Y0D |
| X00 | X01 | X02 | X03 | X04 | X05 | X06 | X07 | X08 | X09 | X0A | X0B | X0C | X0D | X0E | X0F | X10 |
| YFC | YFD | YFE | YFF | Y00 | Y01 | Y02 | Y03 | Y04 | Y05 | Y06 | Y07 | Y08 | Y09 | Y0A | Y0B | Y0C |
| X00 | X01 | X02 | X03 | X04 | X05 | X06 | X07 | X08 | X09 | X0A | X0B | X0C | X0D | X0E | X0F | X10 |
| YFB | YFC | YFD | YFE | YFF | Y00 | Y01 | Y02 | Y03 | Y04 | Y05 | Y06 | Y07 | Y08 | Y09 | Y0A | Y0B |
| X00 | X01 | X02 | X03 | X04 | X05 | X06 | X07 | X08 | X09 | X0A | X0B | X0C | X0D | X0E | X0F | X10 |
| YFB | YFB | YFC | YFD | YFE | YFF | Y00 | Y01 | Y02 | Y03 | Y04 | Y05 | Y06 | Y07 | Y08 | Y09 | Y0A |
| X00 | X01 | X02 | X03 | X04 | X05 | X06 | X07 | X08 | X09 | X0A | X0B | X0C | X0D | X0E | X0F | X10 |
| YFA | YFB | YFB | YFC | YFD | YFE | YFF | Y00 | Y01 | Y02 | Y03 | Y04 | Y05 | Y06 | Y07 | Y08 | Y09 |
| X00 | X01 | X02 | X03 | X04 | X05 | X06 | X07 | X08 | X09 | X0A | X0B | X0C | X0D | X0E | X0F | X10 |
| YF9 | YFA | YFB | YFB | YFC | YFD | YFE | YFF | Y00 | Y01 | Y02 | Y03 | Y04 | Y05 | Y06 | Y07 | Y08 |
| X00 | X01 | X02 | X03 | X04 | X05 | X06 | X07 | X08 | X09 | X0A | X0B | X0C | X0D | X0E | X0F | X10 |
| YF8 | YF9 | YFA | YFB | YFB | YFC | YFD | YFE | YFF | Y00 | Y01 | Y02 | Y03 | Y04 | Y05 | Y06 | Y07 |
| X00 | X01 | X02 | X03 | X04 | X05 | X06 | X07 | X08 | X09 | X0A | X0B | X0C | X0D | X0E | X0F | X10 |

FIG. 2

```
Z00 Z01 Z02 Z03 Z04 Z05 Z06 Z07 Z08 Z09 Z0A Z0B Z0C Z0D Z0E Z0F Z10
Z00 Z01 Z02 Z03 Z04 Z05 Z06 Z07 Z08 Z09 Z0A Z0B Z0C Z0D Z0E Z0F Z10
Z00 Z01 Z02 Z03 Z04 Z05 Z06 Z07 Z08 Z09 Z0A Z0B Z0C Z0D Z0E Z0F Z10
ZFF Z00 Z01 Z02 Z03 Z04 Z05 Z06 Z07 Z08 Z09 Z0A Z0B Z0C Z0D Z0E Z0F
Z00 Z01 Z02 Z03 Z04 Z05 Z06 Z07 Z08 Z09 Z0A Z0B Z0C Z0D Z0E Z0F Z10
ZFE ZFF Z00 Z01 Z02 Z03 Z04 Z05 Z06 Z07 Z08 Z09 Z0A Z0B Z0C Z0D Z0E
Z00 Z01 Z02 Z03 Z04 Z05 Z06 Z07 Z08 Z09 Z0A Z0B Z0C Z0D Z0E Z0F Z10
ZFD ZFE ZFF Z00 Z01 Z02 Z03 Z04 Z05 Z06 Z07 Z08 Z09 Z0A Z0B Z0C Z0D
Z00 Z01 Z02 Z03 Z04 Z05 Z06 Z07 Z08 Z09 Z0A Z0B Z0C Z0D Z0E Z0F Z10
ZFC ZFD ZFE ZFF Z00 Z01 Z02 Z03 Z04 Z05 Z06 Z07 Z08 Z09 Z0A Z0B Z0C
Z00 Z01 Z02 Z03 Z04 Z05 Z06 Z07 Z08 Z09 Z0A Z0B Z0C Z0D Z0E Z0F Z10
ZFB ZFC ZFD ZFE ZFF Z00 Z01 Z02 Z03 Z04 Z05 Z06 Z07 Z08 Z09 Z0A Z0B
Z00 Z01 Z02 Z03 Z04 Z05 Z06 Z07 Z08 Z09 Z0A Z0B Z0C Z0D Z0E Z0F Z10
ZFB ZFB ZFC ZFD ZFE ZFF Z00 Z01 Z02 Z03 Z04 Z05 Z06 Z07 Z08 Z09 Z0A
Z00 Z01 Z02 Z03 Z04 Z05 Z06 Z07 Z08 Z09 Z0A Z0B Z0C Z0D Z0E Z0F Z10
ZFA ZFB ZFB ZFC ZFD ZFE ZFF Z00 Z01 Z02 Z03 Z04 Z05 Z06 Z07 Z08 Z09
Z00 Z01 Z02 Z03 Z04 Z05 Z06 Z07 Z08 Z09 Z0A Z0B Z0C Z0D Z0E Z0F Z10
ZF9 ZFA ZFB ZFB ZFC ZFD ZFE ZFF Z00 Z01 Z02 Z03 Z04 Z05 Z06 Z07 Z08
Z00 Z01 Z02 Z03 Z04 Z05 Z06 Z07 Z08 Z09 Z0A Z0B Z0C Z0D Z0E Z0F Z10
ZF8 ZF9 ZFA ZFB ZFB ZFC ZFD ZFE ZFF Z00 Z01 Z02 Z03 Z04 Z05 Z06 Z07
Z00 Z01 Z02 Z03 Z04 Z05 Z06 Z07 Z08 Z09 Z0A Z0B Z0C Z0D Z0E Z0F Z10
```

| | | | | | | | | |
|---|---|---|---|---|---|---|---|---|
| X00 | Y00 | X01 | Y01 | X02 | Y02 | X03 | X04 | X05 Y05 X06 Y06 X07 Y07 X08 ... |
| X00 | YFF | X01 | Y00 | X02 | Y01 | X03 | Y02 | X04 Y03 X05 Y04 X06 Y05 X07 Y06 X08 ... |
| X00 | YFE | X01 | YFF | X02 | Y00 | X03 | Y01 | X04 Y02 X05 Y03 X06 Y04 X07 Y05 X08 ... |
| X00 | YFD | X01 | YFE | X02 | YFF | X03 | Y00 | X04 Y01 X05 Y02 X06 Y03 X07 Y04 X08 ... |

FIG. 5

| | | | | | | | | |
|---|---|---|---|---|---|---|---|---|
| X00 Y00 | D | X01 Y01 | D | X02 Y02 | D | X03 Y03 | D | X04 Y04 D X05 Y05 D X06 Y06 D X07 Y07 X08 D D D D D D D ... |
| X00 YFF | D | X01 Y00 | D | X02 Y01 | D | X03 Y02 | D | X04 Y03 D X05 Y04 D X06 Y05 D X07 Y06 X08 D D D D D D D ... |
| X00 YFE | D | X01 YFF | D | X02 Y00 | D | X03 Y01 | D | X04 Y02 D X05 Y03 D X06 Y04 D X07 Y05 X08 D D D D D D D ... |
| X00 YFD | D | X01 YFE | D | X02 YFF | D | X03 Y00 | D | X04 Y01 D X05 Y02 D X06 Y03 D X07 Y04 X08 D D D D D D D ... |

| Z00 | Z01 | Z02 | Z03 | Z04 | Z05 | Z06 | Z07 | Z08 | Z09 | Z0A | Z0B | Z0C | Z0D | Z0E | Z0F | Z10 |
|---|---|---|---|---|---|---|---|---|---|---|---|---|---|---|---|---|
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFF | Z00 | Z01 | Z02 | Z03 | Z04 | Z05 | Z06 | Z07 | Z08 | Z09 | Z0A | Z0B | Z0C | Z0D | Z0E | Z0F |
| ZFD | ZFE | ZFF | Z00 | Z01 | Z02 | Z03 | Z04 | Z05 | Z06 | Z07 | Z08 | Z09 | Z0A | Z0B | Z0C | Z0D |
| ZFB | ZFB | ZFC | ZFD | ZFE | ZFF | Z00 | Z01 | Z02 | Z03 | Z04 | Z05 | Z06 | Z07 | Z08 | Z09 | Z0A |
| ZF7 | ZF8 | ZF9 | ZFA | ZFB | ZFB | ZFC | ZFD | ZFE | ZFF | Z00 | Z01 | Z02 | Z03 | Z04 | Z05 | Z06 |
| ZF2 | ZF3 | ZF4 | ZF5 | ZF6 | ZF7 | ZF8 | ZF9 | ZFA | ZFB | ZFC | ZFD | ZFE | ZFF | Z00 | Z01 | Z02 |
| ZEC | ZED | ZEE | ZEF | ZF0 | ZF1 | ZF2 | ZF3 | ZF4 | ZF5 | ZF6 | ZF7 | ZF8 | ZF9 | ZFA | ZFB | ZFB |

FIG. 6 r(Y = 0) = 1 = 001 r(Y = 1) = 4 = 100 r(Y = 2) = 3 = 011 r(Y = 3) = 0 = 000 r(Y = 4) = 5 = 101 r(Y = 5) = 2 = 010 r(Y = 6) = 6 = 110

| R06 | R00 | R01 | R02 | R03 | R04 | R05 |
| U00 | U01 | U02 | U03 | U04 | U05 | U06 |
| V00 | V01 | V02 | V03 | V04 | V05 | V06 |
| R03 | R04 | R05 | R06 | R00 | R01 | R02 |
| U00 | U01 | U02 | U03 | U04 | U05 | U06 |
| V01 | V02 | V03 | V04 | V05 | V06 | V00 |
| R04 | R05 | R06 | R00 | R01 | R02 | R03 |
| U00 | U01 | U02 | U03 | U04 | U05 | U06 |
| V02 | V03 | V04 | V05 | V06 | V00 | V01 |
| R00 | R01 | R02 | R03 | R04 | R05 | R06 |
| U00 | U01 | U02 | U03 | U04 | U05 | U06 |
| V03 | V04 | V05 | V06 | V00 | V01 | V02 |
| R02 | R03 | R04 | R05 | R06 | R00 | R01 |
| U00 | U01 | U02 | U03 | U04 | U05 | U06 |
| V04 | V05 | V06 | V00 | V01 | V02 | V03 |
| R05 | R06 | R00 | R01 | R02 | R03 | R04 |
| U00 | U01 | U02 | U03 | U04 | U05 | U06 |
| V05 | V06 | V00 | V01 | V02 | V03 | V04 |
| R02 | R03 | R04 | R05 | R06 | R00 | R01 |
| U00 | U01 | U02 | U03 | U04 | U05 | U06 |
| V06 | V00 | V01 | V02 | V03 | V04 | V05 |

*FIG. 12*

| ... | ... | ... | ... | ... |
|---|---|---|---|---|
| ... $X_n$ | ... $X_{n+1}$ | | ... $X_{n+2}$ | ... $X_{n+3}$ |
| ... $I_r$ | | ... $I_{r+1}$ | ... $I_{r+2}$ | |
| ... $Y_{m+3+p}$ | $Y_{m+2+p}$ | $I_{s+1}$ | $Y_{m+1+p}$ | $Y_{m+p}$ |
| ... $I_{s+2}$ | | | | $I_s$ |
| ... $X_{n+2p}$ | $X_{n+1+2p}$ | $I_{r+1}$ | $X_{n+2+2p}$ | $X_{n+3+2p}$ |
| ... $I_r$ | | | $I_{r+2}$ | |
| ... $Y_{m+1}$ | $Y_{m+2+3p}$ | $I_{s+1}$ | $Y_{m+1+3p}$ | $Y_{m+3p}$ |
| | ... | ... | ... | ... |

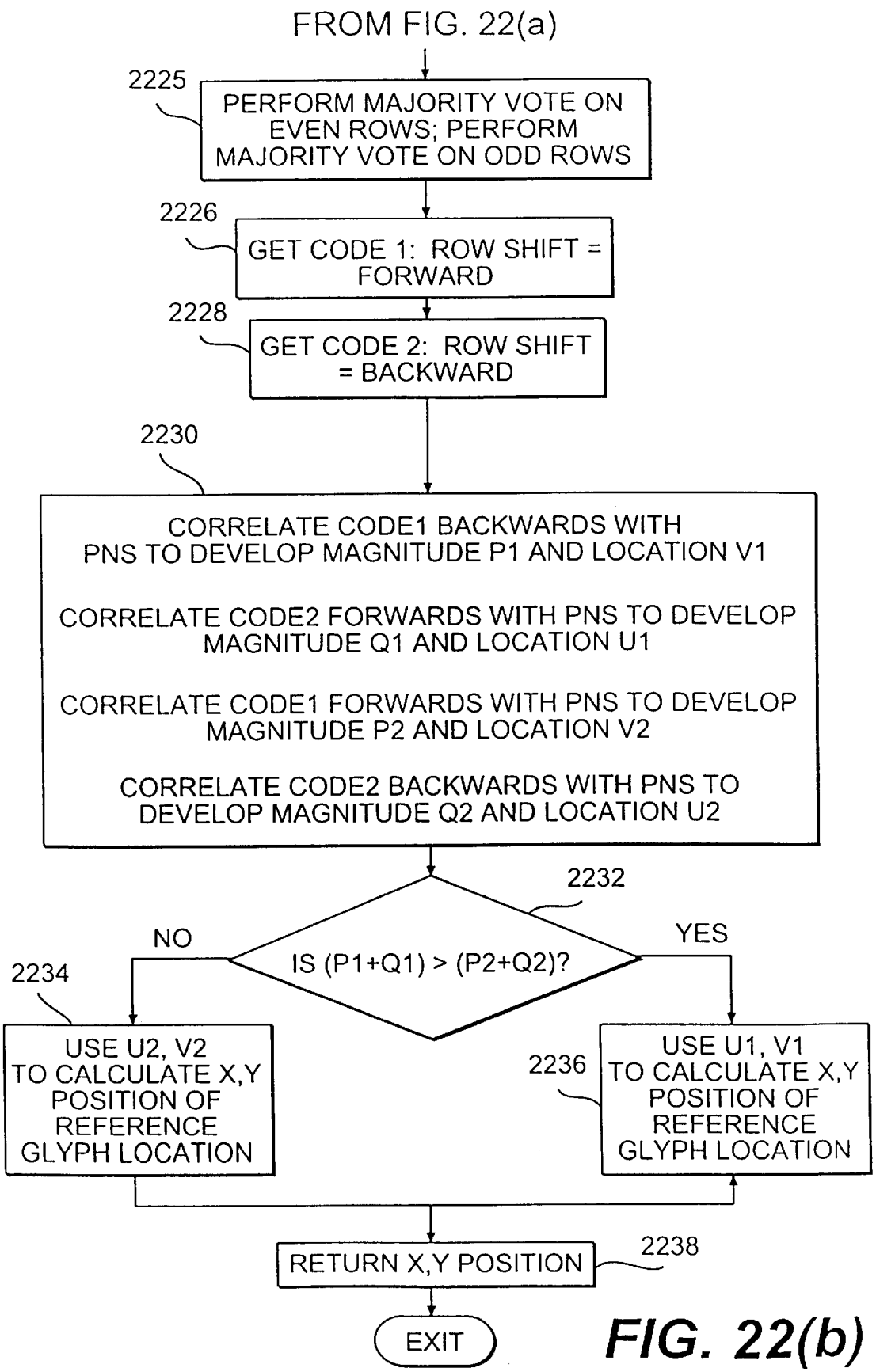

| | | | | | | | | | | | | | |
|---|---|---|---|---|---|---|---|---|---|---|---|---|---|
| B | B | B | B | B | B | B | B | B | B | B | B | B | B |
| B | X | X | X | E | E | 0 | 0 | E | E | X | X | X | B |
| B | X | X | E | 1 | 0 | 1 | 1 | 0 | 0 | 1 | E | X | B |
| B | X | E | 1 | 0 | 0 | 1 | 1 | 1 | 1 | 0 | E | X | B |
| B | E | 0 | 1 | (0) | 0 | 1 | 0 | 1 | 1 | 0 | 0 | E | B |
| B | E | 0 | 0 | 1 | 1 | 1 | 1 | 0 | [1] | 1 | 0 | 0 | B |
| B | 0 | 0 | 0 | 0 | 1 | (0) | 0 | 1 | 0 | 1 | 1 | 0 | B |
| B | 0 | 1 | 1 | 1 | 1 | 0 | [1] | 1 | 0 | 0 | 0 | 1 | B |
| B | E | 1 | 0 | 0 | 0 | 0 | 1 | (0) | 0 | 1 | 0 | 1 | B |
| B | E | 1 | 1 | 0 | [1] | 1 | 0 | 0 | 0 | 1 | 1 | E | B |
| B | X | 1 | 0 | 1 | 0 | 0 | 0 | 0 | 1 | (0) | E | X | B |
| B | X | E | [1] | 1 | 0 | 0 | 0 | 1 | 1 | 1 | E | X | B |
| B | X | X | X | E | 0 | 1 | 0 | 0 | E | E | X | X | B |
| B | B | B | B | B | B | B | B | B | B | B | B | B | B |

FIG. 23

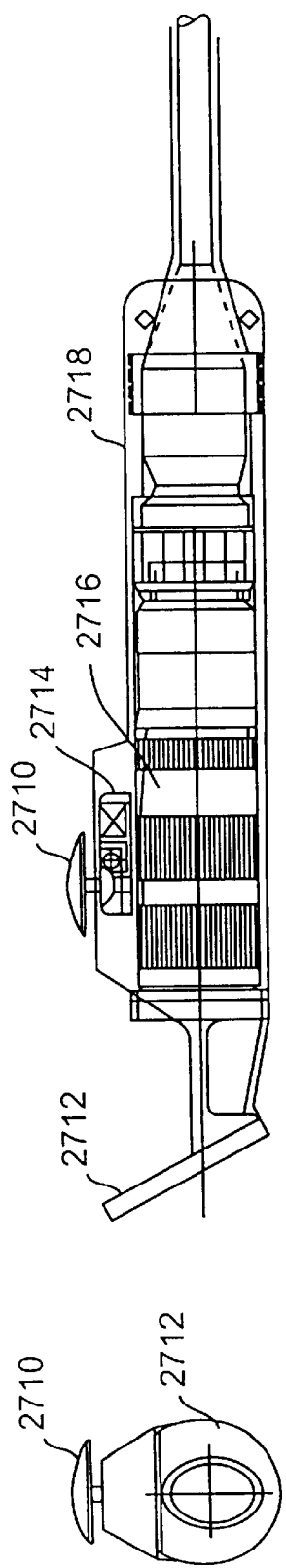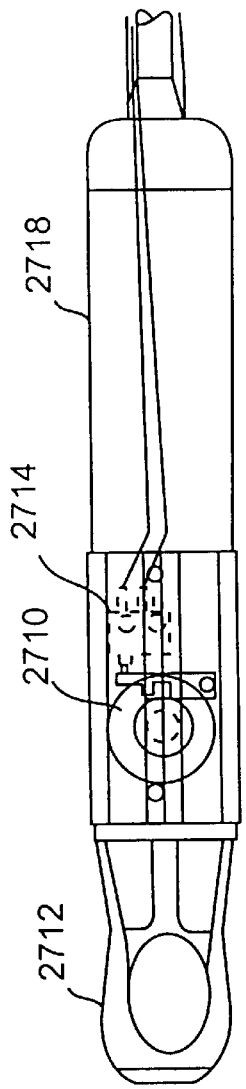
FIG. 27(a)
FIG. 27(b)
FIG. 27(c)

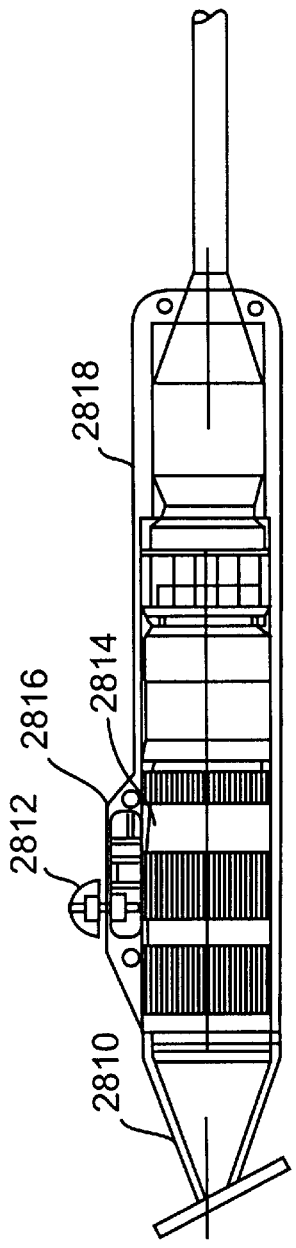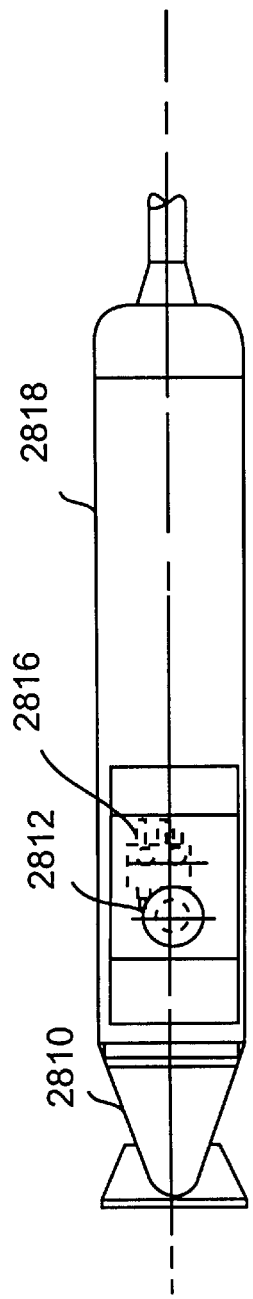
FIG. 28(a)
FIG. 28(b)

METHODS AND APPARATUS FOR ROBUST DECODING OF GLYPH ADDRESS CARPETS

CROSS-REFERENCE TO RELATED APPLICATIONS

This application is a continuation-in-part of U.S. application Ser. No. 08/772,158 filed Dec. 20, 1996, and is related to U.S. patent application Ser. No. 09/144,251, entitled GLYPH ADDRESS CARPET METHODS AND APPARATUS FOR PROVIDING LOCATION INFORMATION IN A MULTIDIMENSIONAL ADDRESS SPACE and U.S. patent application Ser. No. 09/144,250, entitled METHODS AND APPARATUS FOR CAMERA PEN, filed concurrently herewith.

BACKGROUND OF THE INVENTION

A. Field of the Invention

This invention relates to the construction of multi-dimensional address spaces and, more particularly, to self-clocking and address carpet glyph instantiations of such address spaces and disambiguation techniques for address carpets.

B. Background of the Invention

Self-clocking glyph codes, such as Xerox DataGlyphs, are attractive for embedding machine readable digital information in images of various types, including ordinary hardcopy documents. These codes have substantial tolerance to image distortion and noise because the digital information they encode is embedded in and fully defined by explicit machine readable marks (i.e., "glyphs"). These glyphs not only encode the information that is embedded in the code, but also define the sample clock that is employed to extract that information from the code, so they are responsible for the "self-clocking" property of the code as well as the distortion and noise tolerance.

Another known advantage of self-clocking glyph codes is that they ordinarily have an unobtrusive visual appearance. This is especially so of codes which are composed of glyphs which are written on a two dimensional spatially periodic pattern of centers, such as a regular lattice-like pattern of centers, because the spatial periodicity of the glyphs causes the code to have a more or less uniformly textured appearance. For example, logically ordered single bit digital quanta typically are encoded by respective elongated slash-like glyphs which are written on a two dimensional, spatially periodic pattern of centers in accordance with a predetermined spatial formatting rule, with the individual glyphs being tilted to the left and right of vertical by approximately +45° and −45° for encoding logical "0's" and "1's", respectively. The mutual orthogonality of the glyph encodings for the two logical states of these single bit digital quanta enhances the discriminability of the code sufficiently to enable the embedded information to be recovered, even when the code pattern is written on a sufficiently fine grain pattern of center to cause the code pattern to have a generally uniform grayscale appearance. It, however, is to be noted that it also has been shown that self-clocking glyph codes can be designed to encode multi-bit digital quanta in the glyphs.

Prior proposals have dealt with the general subject of constructing address spaces in the image domain by encoding cyclical pseudo-noise digital bit sequences (sometimes referred to as "PN sequences") and other types of maximal length-like digital bit sequences (i.e., sequences of length, L, in which every N-bit long subsequence is unique) in two dimensional spatially periodic self-clocking glyph code patterns. One of the unifying themes of these prior proposals is that they recommend constructing two dimensional address spaces by mapping at least two bit sequences of the foregoing type into such a code pattern so that these bit sequences are encoded to propagate in predetermined directions along respective non-parallel lines of glyphs.

While it has been shown that the bit sequences need not be mapped into the code pattern in alignment with the principal axes thereof, it often is desirable to employ such mappings to reduce the computations that are required to determine the relative addresses of the glyphs in standard Cartesian coordinates (i.e., "x" and "y" parameters expressed in units of glyphs). Furthermore, it is known that the encodings of these bit sequences may completely or partially span the glyph code pattern, so it is to be understood that the addressing that is afforded by them is effective only within that portion of the glyph code pattern that projects onto both of the encodings. Moreover, the aforementioned bit sequences may be mapped into the glyphs on these non-parallel lines at unitary or fractional duty ratios, but it has been recognized that mappings preferably are spatially cyclical for applications in which it is desired to compute relative addresses for glyphs within the address space.

Every bit in a maximal bit length sequence resides at a predetermined uniquely determinable logical position within the sequence. Accordingly, an ordered index of integers is commonly employed to distinguish those bits from each other on the basis of their respective ordinal logical positions within the sequence. These positionally dependent index numbers can, of course, be employed for selectively addressing the glyphs which encode the bits of such a sequence. However, addressing information in at least one additional dimension is required to uniquely identify the spatial locations of those glyphs or any other glyphs that are included within a two dimensional glyph code pattern. These unique identifiers of the individual glyphs are referred to as "absolute addresses" because they identify the unique locations at which the individual glyphs reside within the glyph code pattern.

As is known, the spatial address (i.e., the absolute address) of almost any given glyph in an address space of the foregoing type is identifiable, at least to a first approximation, by a metric which specifies the offset distances (if any) between the nominal center of the given glyph and the non-parallel lines of glyphs that encode the respective maximal length bit sequences, where these offsets are measured parallel to the principal axes of the code pattern and are expressed in units of glyphs. In applications where the maximal length sequences are encoded by glyphs on orthogonal lines which align with the principal axes of a self-clocking glyph code pattern that is written on a regular rectangular lattice of centers, the above-described metric reduces to an x/y coordinate pair which identifies the spatial location of the given glyph with substantial precision in a standard Cartesian coordinate system. Unfortunately, however, the intersections of the lines on which these maximal bit length sequences are encoded tend to restrict the freedom of design choice if there are glyphs at any of these intersections.

It has been shown that this unwanted limitation on the explicit spatial addressing of glyphs in self-clocking glyph code patterns can be avoided if the glyphs are written on a lattice of centers of predetermined width and/or height, so that there are a known or determinable fixed number of glyphs on every line of the code pattern along at least one of those dimensions. More particularly the solution that has been proposed for this special class of code patterns is to encode a maximal length bit sequence (or a combination of interleaved, relatively prime maximal length bit sequences) in the glyphs in a raster-like pattern which is selected to cause the logically ordered bits of the sequence to spatially propagate from side-to-side along a known dimension (say, the width) of the code pattern which more gradually propagating along the other (e.g., the height) of the code pattern in, say, top-to-bottom order. This raster encoding of the maximal length bit sequence effectively "folds" the bit sequence into the code pattern module a known or computable number of glyphs (i.e., the number of glyphs that the code pattern contains along its known dimension). Accordingly, the spatial address of any given glyph within the code pattern can be computed in x/y coordinate space from the sequence index number of the bit that is encoded by the glyph by dividing the sequence index number of the bit by the known glyph count/line modules.

Unfortunately, this raster encoding style solution to the spatial addressing problem is not only limited to a constrained class of code patterns, but also tends to be computationally costly. The computational costs of this approach are elevated because the subsequence bit length, N, over which the maximal length bit sequence must be unique scales as a function of the square root of the address space that is being served. This scaling is an inherent consequence of the fact that the number of unique phases (or "bit index positions") of a maximal length bit sequence is given by $N^2-1$.

Clearly, therefore, it would be desirable to have a more flexible technique for embedding logically ordered address information in some or all of the glyphs of self-clocking glyph code patterns for more computationally efficiently identifying the unique spatial locations of individual glyphs within such code patterns. Indeed, it would be desirable to parameterize such code patterns in N-dimensional space so that these address spaces, or fragments of them, can be used for hierarchically identifying two and three dimensional objects.

SUMMARY OF THE INVENTION

In accordance with one embodiment of this invention, machine readable fragments of a code pattern that is parameterized in N-dimensional space, where $N \geq 2$, are affixed to two or three dimensional physical objects, such that the objects are uniquely identified by the addresses of the machine readable address space fragments affixed thereto.

In accordance with this invention, it has been recognized that the relative immutability of the optical image domain is not a disqualifier for optical image domain implementations of graphical user interfaces for computers. Indeed, for some applications, such as to user interfaces for archival file management systems or for persistent, infrequently updated database systems, the relative immutability of the graphical user interfaces of this invention may be insignificant, especially when compared against the ease of constructing large concurrently viewable address spaces in compliance with this invention.

To carry out this invention, an optical symbolic encoding of one or more logically ordered, acyclic binary sequences is written on a two dimensional generally periodic lattice of centers on a suitable display medium. The bit sequence or sequences are selected so that this encoding effectively assigns absolute x/y addresses to the respective centers in relative spatial order. Advantageously, the encoding is performed using a self-clocking glyph code so that the address space that is defined by the encoding has a generally neutral appearance.

Human interpretable textual, graphical or mixed textual and graphical representations of the files that are accessible via this user interface are spatially registered in superimposed or juxtaposed relationship with respective addresses in this address space. These spatial addresses, in turn, are logically registered in a lookup table or the like with computer recognizable descriptions of the respective file names and, if needed, paths to the directories for the named files.

BRIEF DESCRIPTION OF THE DRAWINGS

Still further objects of this invention will become apparent when the following detailed description is read in conjunction with the attached drawings, in which:

FIGS. 2–8 schematically illustrates two dimensional image domain address spaces that are constructed by embedding address information in self-clocking glyph code patterns or the like in accordance with this invention;

FIG. 14 illustrates a system-level application of N-dimensional image domain address spaces, where $N \geq 2$;

FIG. 21 illustrates an embodiment of the address codes encoded in the glyph address carpet 1732;

FIG. 22(a) and FIG. 22(b) form a flow chart showing the disambiguation and address decoding processes performed on the captured image area by computer 1712;

FIG. 23 illustrates a binary data matrix 2310 formed from a glyph lattice captured by camera pen 1710;

FIGS. 27(a), 27(b), and 27(c) show front, side and top views, respectively, of one embodiment of glyph pen 1710 of FIG. 17;

FIGS. 28(a) and 28(b) show side and front views, respectively, of another embodiment of glyph pen 1710 of FIG. 17;

DETAILED DESCRIPTION OF THE INVENTION

While the invention is described in some detail hereinbelow with reference to certain illustrated embodiments, it is to be understood that it is not limited to those embodiments. On the contrary, the intent is to cover all modifications, alternative, and equivalents falling within the spirit and scope of the invention as defined by the appended claims.

A. Self Clocking Glyph Codes

Figure 1:
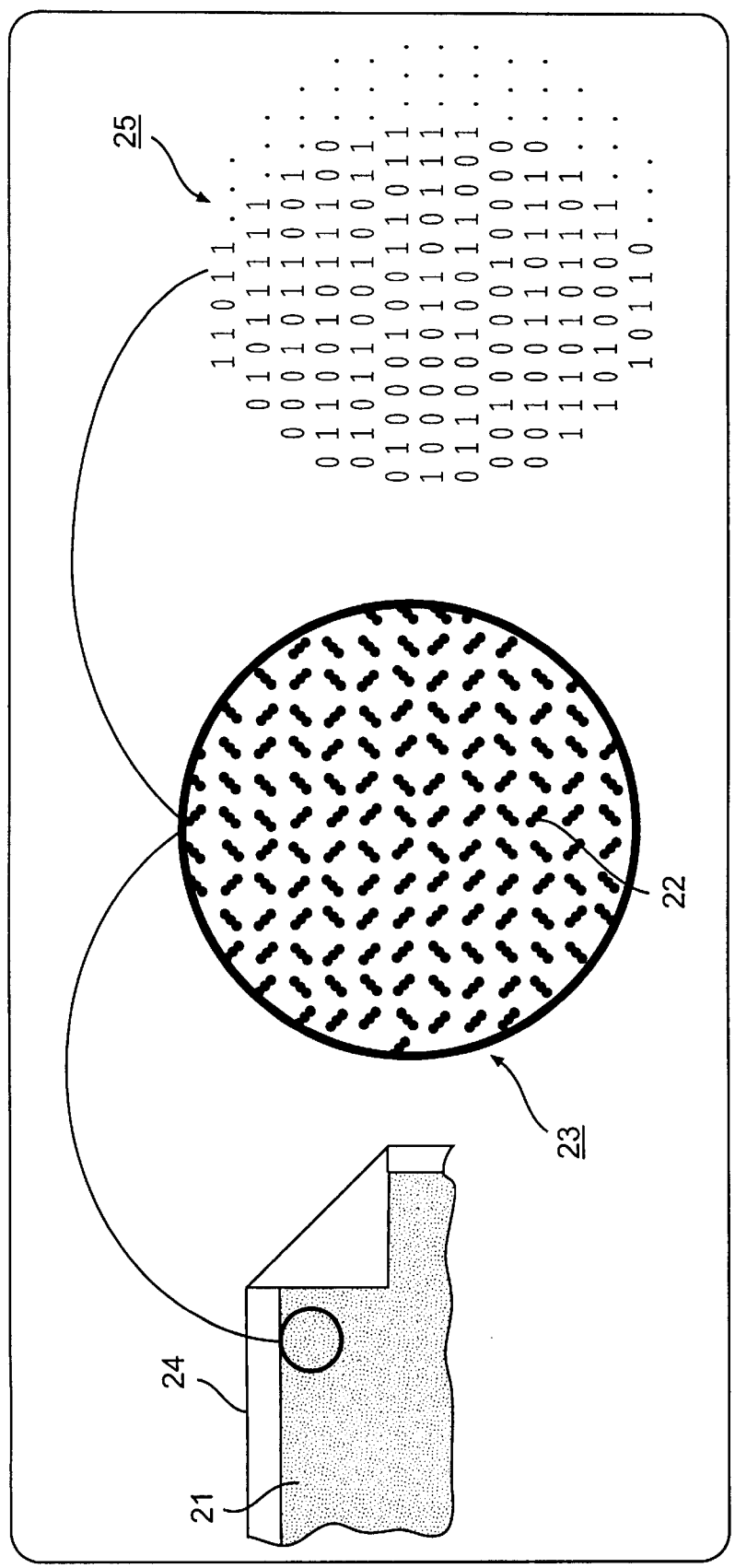
FIG. 1 illustrates a self-clocking glyph code pattern and a portion of its binary interpretation.

Turning now the drawings, and at this point especially to FIG. 1, there is a more or less conventional self-clocking glyph code pattern 21 which is composed of elongated slash-like marks or "glyphs" 22 and 23 that are written on a generally regular rectangular lattice of centers on a suitable recording medium 24. Suitably, the glyphs 22 and 23 are printed by a printer (not shown) operating at 300 d.p.i.–600 d.p.i. to write 4 pixel×4 pixel–7 pixel×7 pixel representations of the glyphs 22 and 23 on regularly spaced centers that are distributed widthwise and lengthwise of the recording medium 24 to produce the rectangular code pattern 21. The glyphs of these fine grain glyph code patterns are not easily resolved by the unaided human eye when the code patterns are viewed under standard lighting conditions and at normal reading distances, so the code pattern 21 typically has a generally uniform gray scale appearance. Nevertheless, the glyph code is still capable of effectively communicating machine readable digital information. To carry out this function, the glyphs 22 and 23 usually are titles to the left and right, at about +45° and −45° with respect to the longitudinal dimension of the recording medium 24 to encode binary "1's" and "0's", respectively, as shown at 25.

B. The Relative Phase of Parallel Propagating Embedded Maximal Length Bit Sequences as a Spatial Address Parameter FIGS. 2–8 diagramatically illustrate image domain address spaces which are constructed by embedding multiple instances of one (FIGS. 3 and 6) or two (FIGS. 2, 4, 5, 7 and 9) maximal length bit sequences ("Z" in FIGS. 3 and 6, "X" and "Y" in FIGS. 2, 4 and 5, and "U" and "V" in FIGS. 7 and 8) in a self-clocking glyph code pattern 21 (FIG. 1). These maximal bit length sequences are encoded by the glyphs on parallel lines of the glyph code pattern to propagate in a predetermined direction, such as a left-to-right direction, from one side of the address space to the other. However, the relative phase, $\phi_R$, of the bit sequences (or at least certain of the bit sequences—see FIG. 4) that are encoded on neighboring ones of these lines incrementally varies as a function of the transverse positioning of those lines in the address space (i.e., as a function of the position of those lines in the address space (i.e., as a function of the position of the respective lines relative to the Y-axis of the address space). The phase shift corresponds to translating the code parallel to its linear direction by an integer number of bits.

In the address spaces shown in FIGS. 2, 3, and 5–8, the maximal length bit sequence encoded on all of the odd numbered lines are phase aligned. However, the sequences encoded on the even numbered lines are phased shifted to the right, in successive one bit position increments, so the transverse positioning of any given even numbered line in these address spaces is given by:

$$Y = 2\phi_R + 1 \tag{1}$$

Where: $\phi_R$=the phase of the sequence encoded on the given even numbered line relative to the phase of the sequence encoded in a neighboring odd numbered line Equation (1) can, of course, be restated for any constant incremental phase shift, $\Delta\phi_R$, as follows:

$$Y = \frac{2\phi_R + \Delta\phi_R}{\Delta\phi_R} \tag{2}$$

Furthermore, it follows from equation (1) that the relative transverse position of the sequence encoded on the immediately preceding odd numbered line is given by:

$$Y = 2\phi_R \tag{3}$$

While the transverse positioning of the sequence encoded on the immediately following odd numbered line is given by:

$$Y = 2(\phi_R + 1) \tag{4}$$

The phase differences $\phi_R$ between the odd and even numbered lines can be computed in either order, provided that a consistent order is employed.

The best practice for identifying the location of a given glyph with respect to the transverse or Y-axis of such an address space is to capture a sufficiently large area of the address space to determine the phase of the sequence that is encoded on the line containing the given glyph relative to the phases of the sequences encoded on the next preceding and next following lines of the address space. The two-way relative phase analysis that is enabled by this three sequence phase determination effectively discriminates between odd and even numbered lines in the address space, even if one or more of the sequences has "rolled over" in the address space. As will be appreciated, the principal implication of this two-way relative phase analysis technique is that it requires that capture of a sufficiently large number of the bit encodings from each of the three sequences to phase lock on to each of those sequences. Typically, pattern matching (or sliding window correlation) process is employed to find the phase locked state in a maximal length bit sequence. For cases where the width, W, of the address space equals the length, L, of the maximal bit length sequence in question, this correlation process requires a capture of at least N bits sequence, where N is the unique subsequence bit length of the maximal bit length sequence to establish phase lock (preferably, the correlation process given approximately 2N bits or more to establish phase lock with a desirable higher degree of confidence in its correctness). Note the maximal PN sequence ordinal position can be correlated normally even in the neighborhood of rollover at the end of the code (the code is cyclic). If a truncated PN sequence or the like is used, a somewhat larger typical capture region (no more than twice the extent along the linear code direction) would be needed to assure ambiguous address determination. If any one of a family of sequences may be used, more glyphs in the sequence may be needed to distinguish allowed sequences.

Figure 7:
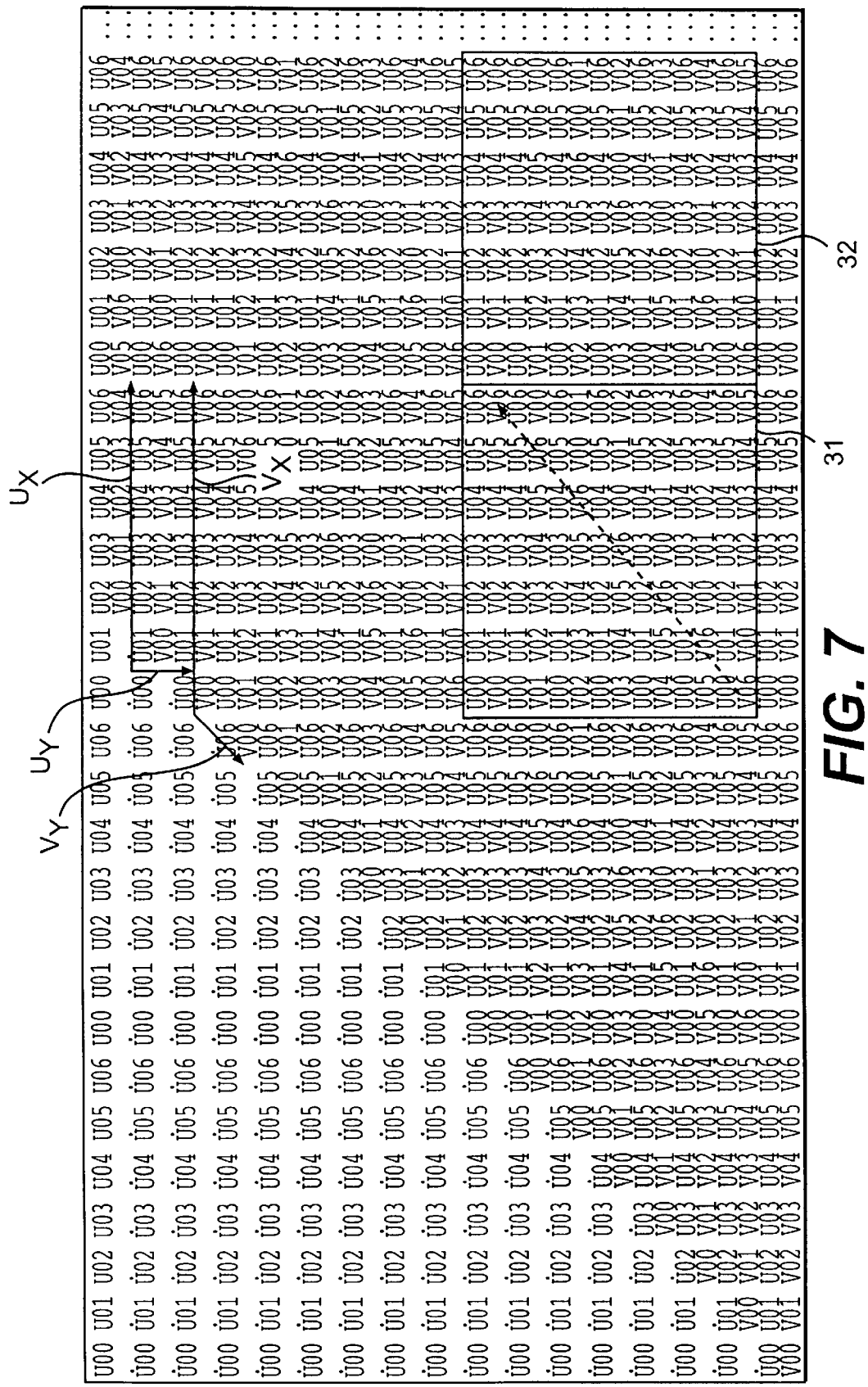

As shown in dashed lines in FIG. 7, phase roll over can be avoided by reducing the effective address space by a factor of two, so that all phase shifts are in the same absolute direction (i.e., same sign sense). That, in turn, permits a one-way relative phase analysis is to be used for determining the relative transverse positions (i.e., the positioning relative to the Y-axis) of the lines of such an address space glyphs on the odd and even numbered lines encode different maximal bit length sequences (such as at "X" and "Y" in FIGS. 2, and U and V in FIGS. 7 and 8) because the sequences themselves can then be used to distinguish between the odd and even numbered lines.

However, it is believed that the relative phase difference, $\phi_R$, between the maximal length bit sequences propagating on any two neighboring lines of the address space can be determined from the difference between the sequence index numbers, i and j, of the bits of those respective sequences that are encoded by any transversely aligned glyphs on those respective lines. More particularly, it is believed phase difference $\phi_R$ can be determined from the difference, if any, of the sequence index numbers by (1) summing the index difference (i-j) with (2) the smallest integer multiple of the width, W, of the address space width which (3) yields a positive integer multiple that is (4) evenly divisible by the relative incremental phase shift of the respective sequences; (5) by dividing the positive integer that is found at step 3 to satisfy the condition specified by step 4; and by then (6) evaluating the quotient resulting form step 5 module the width, W (in glyphs), of the address space. While this formulation has not been fully tested for all cases, its effectivity has been confirmed with substantial rigor for the address space shown in FIG. 8 (i.e., where the maximal bit length sequences on the odd and even numbered lines are incrementally phase shifted; each by one bit sequence index position, but in opposite directions to provide a relative incremental phase shift of two bit positions. Further, its effectivity has been less rigorously confirmed for the address spaces of the type shown in FIG. 2 (i.e., incremental relative phase shift of just one bit index position.

As will be appreciated, the bit sequence indices of the unshifted maximal length bit sequences suitably are employed to identify the spatial location of the glyphs that encode those sequences with respect to the X-axis of the address space. Thus, once the spatial positions of the lines on which those sequences are encoded are located relative to the Y-axis of the address space, there is a unique x/y coordinate pair for identifying the spatial location of each of those glyphs is the address space. A similar process is employed to determine the x/y coordinate pairs for the glyphs that encode the phase shifted maximal length bit sequences, except the bit sequence indices of those sequences are normalized to account for the accumulated phase shift and roll over of those sequences prior to computing the positions of the glyphs that encode those sequences relative to the X-axis of the address space.

Focusing for a moment on FIG. 4, it will be seen that glyph encodings of maximal length bit sequences which define the X and Y coordinates of the address space may be interleaved on each of a set of parallel lines of the glyph code pattern. As illustrated, the phase of the "Y" sequence is incrementally shifted to the right on each line of the code pattern, so the relative phases of the interleaved "X" and "Y" sequences that are encoded on the respective lines of the code pattern may be employed, as previously described, to determine the locations of the respective lines of the code pattern relative to the Y-axis of the address space. Furthermore, the process that is described above may be employed to locate the individual glyphs of the code pattern relative to the X-axis of the address space.

Referring to FIG. 5, it will be understood that an interleaved construction of the address space is particularly beneficial for applications in which data encodings, D, or the like are transversely interlaced with the spatial addressing information. For these applications, the addressing information is cyclically encoded at a predetermined fractional duty cycle ratio, such as 1/5 as shown, so an appropriately phased scaling factor is used to compute the location of the encodings of the address information relative to the Y-axis of the address space. Once these locations have been determined, the locations of the data encodings relative to the Y-axis of the address space can also be identified by using the self-clocking properties of the glyph code.

While incremental linear phase shifts of the maximal bit length sequences that define the address space are typically employed to parameterize the address space relative to one axis, such as the Y-axis as described above, incremental arithmetic phase shifts of various type can be employed for that purpose. For example, as shown in FIG. 6, a cumulative arithmetic function is used to cause the relative phase difference between the maximal bit length sequences that are encoded on neighboring lines of the code to directly parameterize the position of one of those lines (i.e., the lower line) relative to the Y-axis of the address space.

Figure 8:
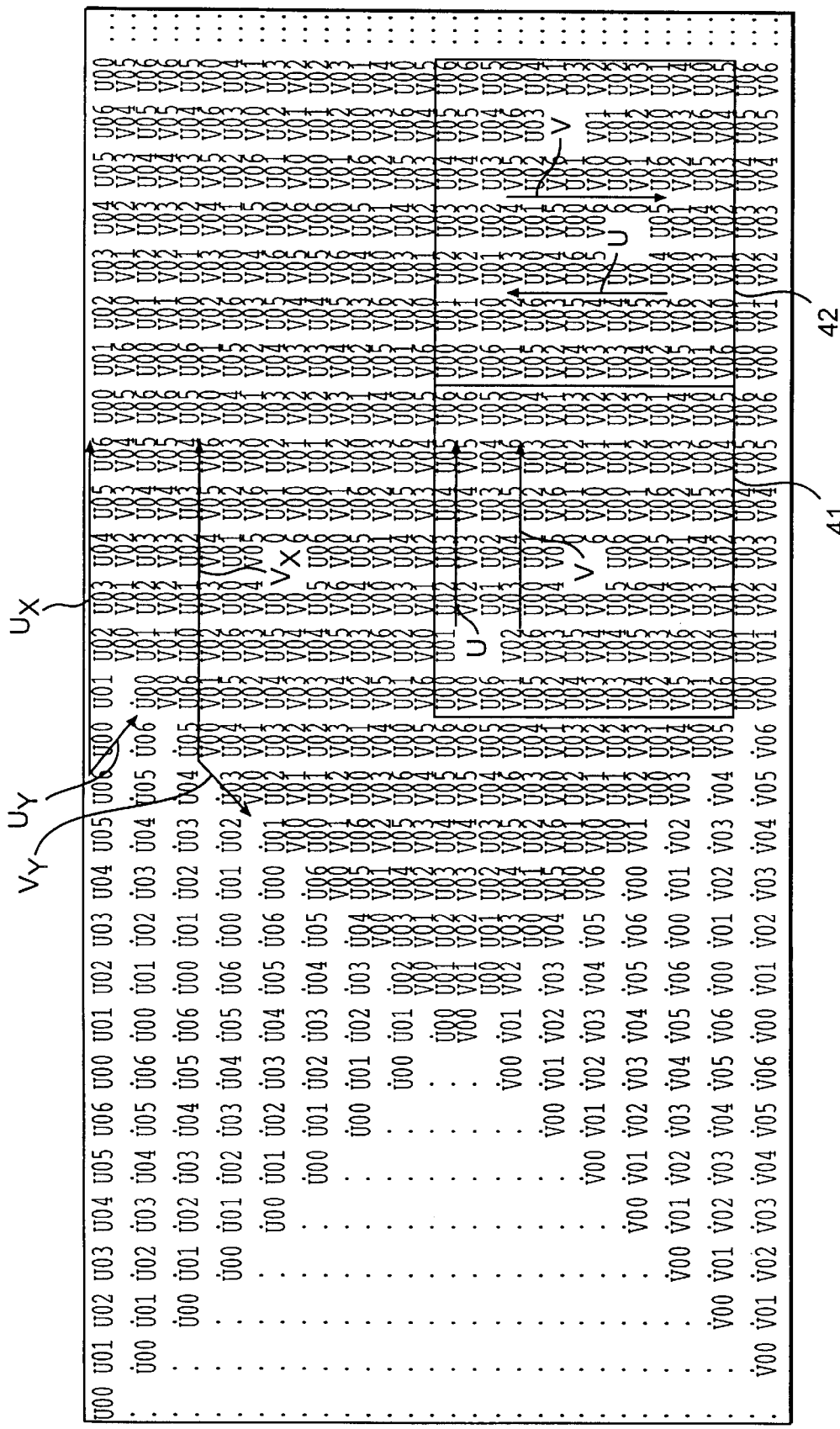

Turning now to FIGS. 7 and 8, it will be seen that address spaces that are parameterized relative to one axis by linear incremental phase shifts advantageously are constructed by tiling the maximal length bit sequence or sequences into the glyph code pattern on tiling vectors that map the bit sequences into the code pattern with the desired relative phase shifts. For example, as shown in FIG. 7, the "U" and "V" maximal length bit sequences are tiled into the glyph code pattern on tiling vectors $U_x$, $U_y$ and $V_x$, $V_y$, respectively, which interlace those sequences on alternate parallel lines of the code pattern, while incrementally shifting the "V" sequence one bit index position to the right on every other line of the code pattern. This, of course, creates an address space 31 of the type that is shown in FIG. 2. Indeed, the tiled construction of the address space 31 distributively replicates that space at other locations in the glyph code pattern, such as at 32, thereby providing a distributed redundancy in code patterns that are sufficiently large to encode these multiple instances 31 and 32 of the address space. Note, all of the address codes may be tiling; the ones having fixed line-to-line shifts for each code are "periodic" tilings.

FIG. 8 illustrates a tiled construction where the "U" and "V" maximal length bit sequences are tiled into the glyph code pattern on tiling vectors $U_x$, $U_y$ and $V_x$, $V_y$ respectively, which also interleave those sequences on alternate parallel lines of the code pattern. However, unlike the "mono shear" tiled case shown in FIG. 7, in this embodiment that tiling vectors produce a "dual shear" tiling of the sequences U and V, such those sequences are incrementally phase shifted one sequence index position to the left and right, respectively, on every other line of the code pattern. This tiling creates address spaces 41 and 42 which contain precisely the same members, but the members of those address spaces 41 and 42 differ in both their spatial and logical organization, so the organization that best fits a given application can be used.

Figure 9:
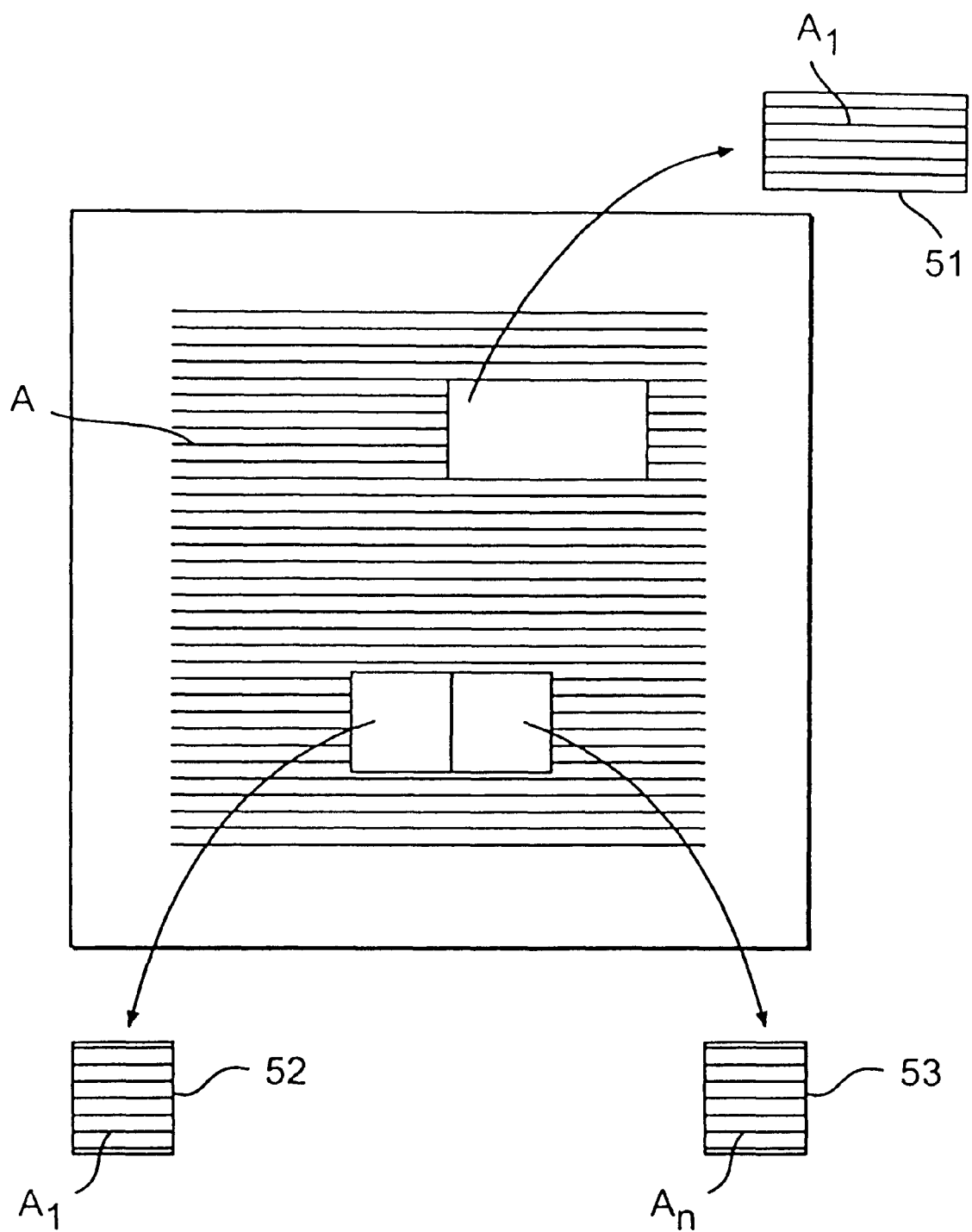
FIG. 9 illustrates a fragmentation of an address space of the type shown in FIGS. 2–8.

Turning now to FIG. 9, it will be evident that contiguous and/or non-contiguous non-overlapping fragments $A_1 \ldots A_n$ of an address space A of the above described type may be written on different substrates 51–53. Each of these fragments $A_1 \ldots A_n$ must contain a sufficiently large sample of the maximal length bit sequences that parameterized the address space A in the image domain to permit the x/y coordinate pairs for the glyphs they contain to be computed as described above, but they otherwise can be sized as required to best satisfy the needs of a given application. The fragments $A_1 \ldots A_n$ need not define a complete cover of the address space, but one of the more attractive applications of this feature is to print out contiguous fragments of a large address space A on multiple substrates so that these printed fragments provide an essentially complete cover of the address space A.

Figure 10:
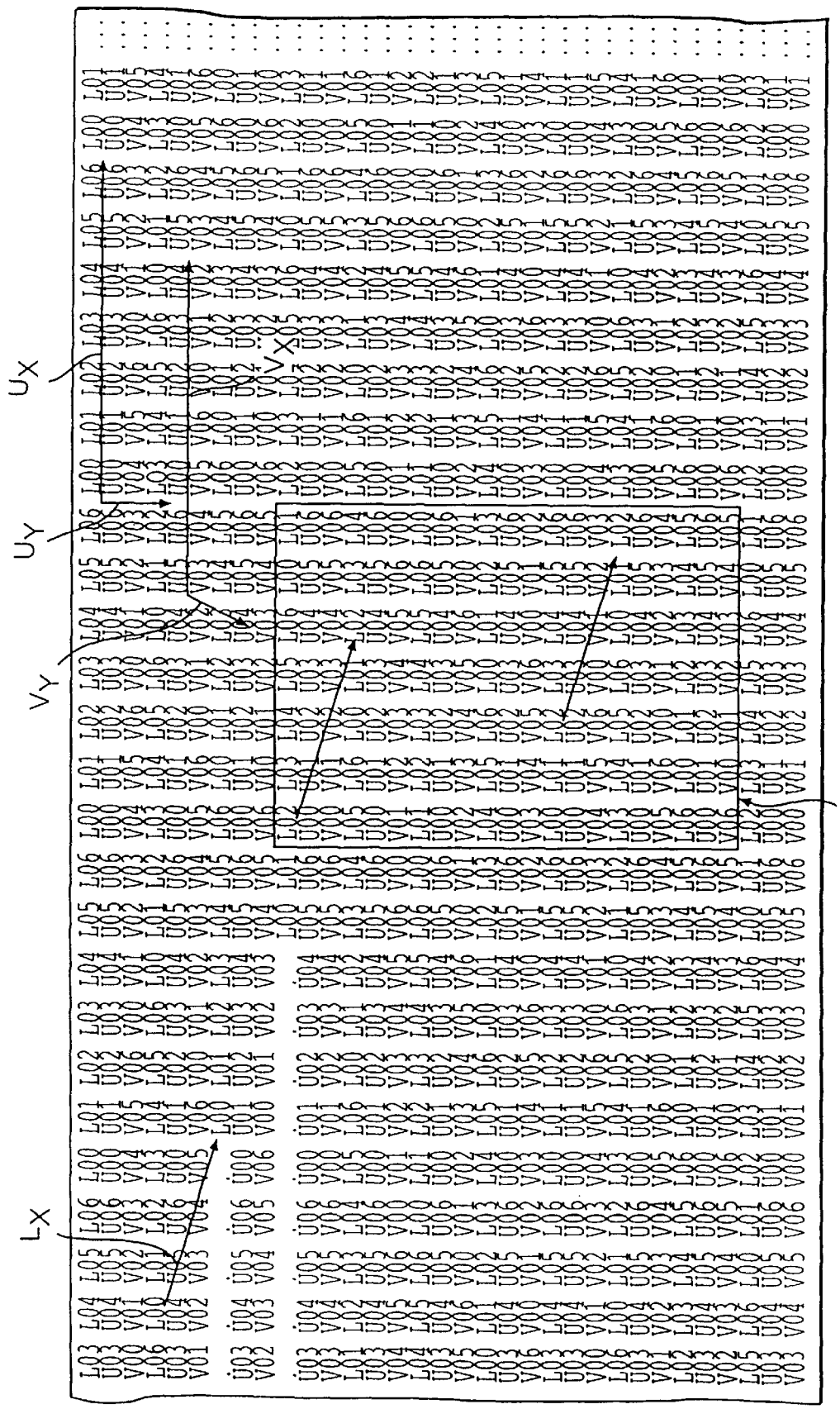
FIGS. 10 and 11 illustrate the labeling of address spaces of the type shown in FIGS. 2–8.

C. The Relative Phase of an Interlaced Parallel Propagating Maximal Length Bit Sequences as a Labeling Parameter for Spatial Address Spaces Referring to FIG. 10, the functionality of address spaces of the foregoing type can be extended by cyclically interlacing (or interleaving) encodings of another parallel propagating maximal length bit sequence L with the encodings of the sequence or sequences, such as U and V, which parameterize the address space 61 with respect to its x/y coordinates. This additional bit sequence L further parameterizes the address space 61 by embedding a machine readable distributed label in it. As shown in FIG. 10, this label is a numeric value which is determined by the incremental phase shift between successive encodings of the sequence L. This phase shift may, of course, be adjusted to selectively embed any one of a plurality of different labels in the address space 61. A look-up table or the like (not shown) can be employed to interpret the embedded label based on its numeric value. In this embodiment, the distributed label L is independently interpretable.

Figures 11, 12:
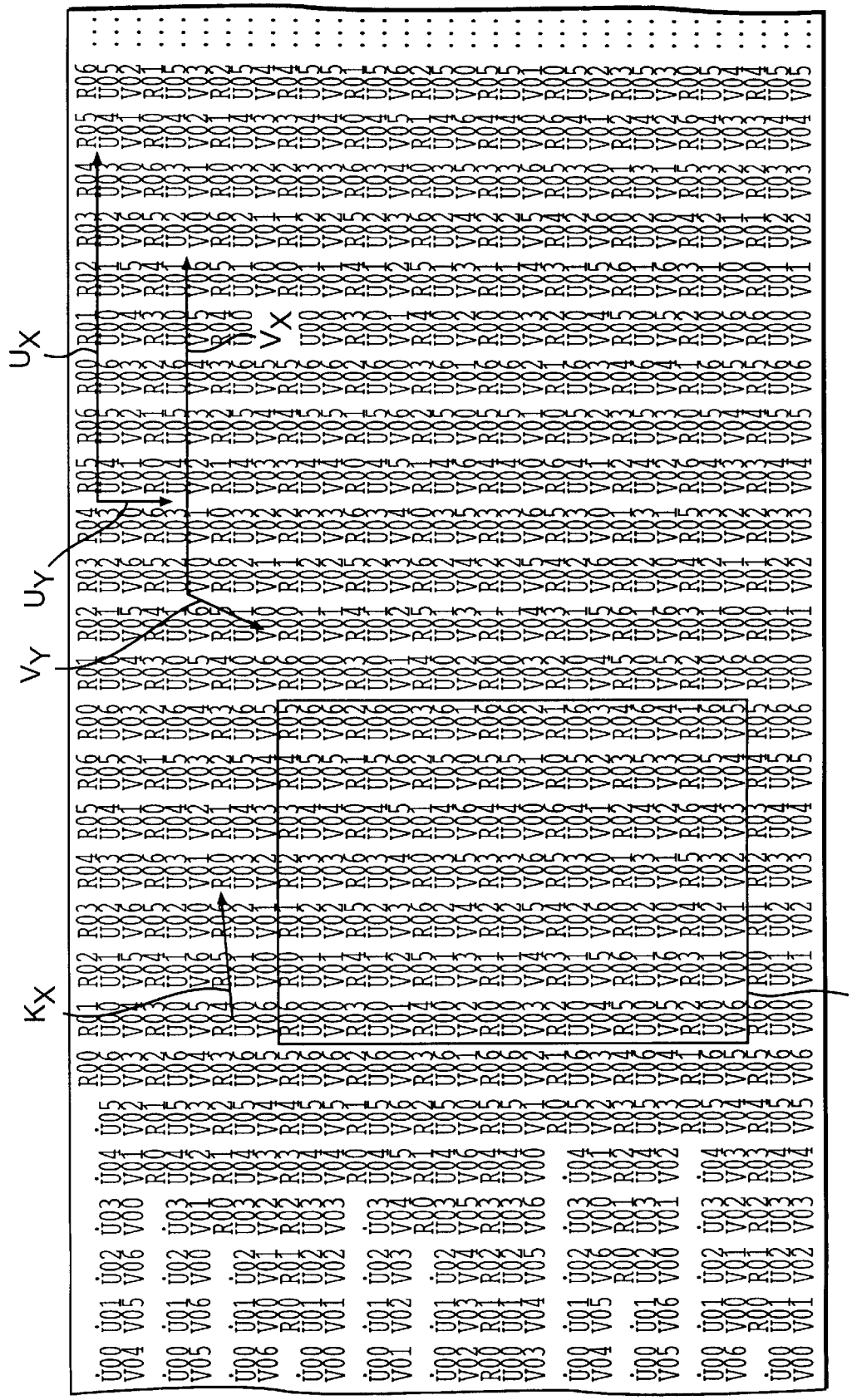
FIG. 12 illustrates an application of labeled address spaces of the type shown in FIGS. 10 and 11.

However, as shown in FIGS. 11 and 12, a distributed labeling that requires a computationally less intensive read out of the address space is provided if the encodings of the labeling sequence, r, is referenced to the encodings of one or another of the address defining sequence U or V. This relatively minor change avoids the correlation processing which the embodiment of FIG. 10 requires to latch on to the phase of the reference copy of the labeling sequence.

Figure 13:
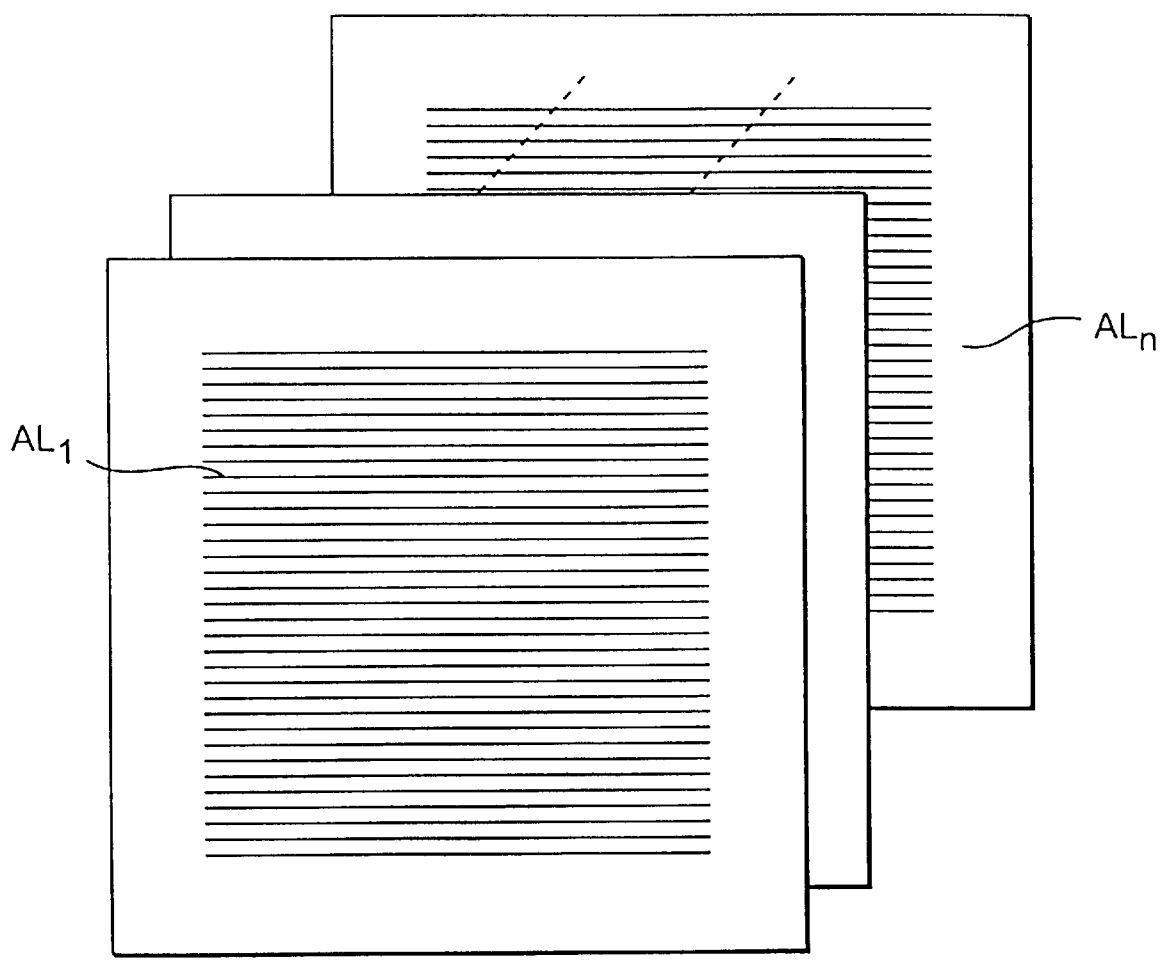
FIG. 13 illustrates, in fragmentary form, code labeling for image domain address space.

Turning to FIG. 13, one of the advantages of including a distributed labeling parameter in address spaces of the foregoing type is that the labeling provides a hierarchical mechanism for distinguishing between address spaces that include otherwise identical address parameters. This hierarchical labeling mechanism may be used, for example, to classify the address spaces $_{ALL} \ldots AL_n$ for various purposes or to index the address spaces $_{ALL} \ldots AL_n$ into a hierarchically organized look-up table or the like.

D. Further Characterizing N Dimensionally Parameterized Code Pattern By Selection of Parameterizing Code Sequences It is desirable for some applications to select the maximal length bit sequences that parameterize the glyph code pattern in two dimensions from a family of candidates so that the selection of one or both of those sequences effectively parameterizes (i.e., "labels") the glyph code pattern in accordance with still another metric. However, the computational cost of testing all, or even a significant subset of the maximal bit length sequences that might be candidates for such a selection is likely to be prohibitive.

Thus, as shown in FIG. 13, to reduce the computation cost of implementing this type of address space labeling (or "characterization"), encodings of a prespecified maximal length bit sequence I are interleaved (typically at a 50% duty ratio) with the encodings of the address space parameterizing maximal length bit sequences, X and Y. Accordingly, one or both of the parameterizing sequences X and Y may be selected from a family of potentially suitable sequences to further characterize the address space in accordance with any desired metric. This freedom to select does not significantly reduce the computation cost of interpreting the address space because the relative phase difference between the transversely neighboring instances of the prespecified (i.e., "known") sequence is set to uniquely identify the sequences X and Y that have been selected to parameterize the glyph code pattern in address space.

In the embodiment shown in FIG. 14, neighboring instances of the known sequence I, as well as neighboring instances of the X and Y sequences, are counter propagating. It, therefore, should be understood that counterpropagating sequences need not be used since the relative phasing of these sequences can be determined as described hereinabove when they propagate in the same direction.

E. Uniquely Identifying Physical Objects in Parameterized Address Space

Figure 15:
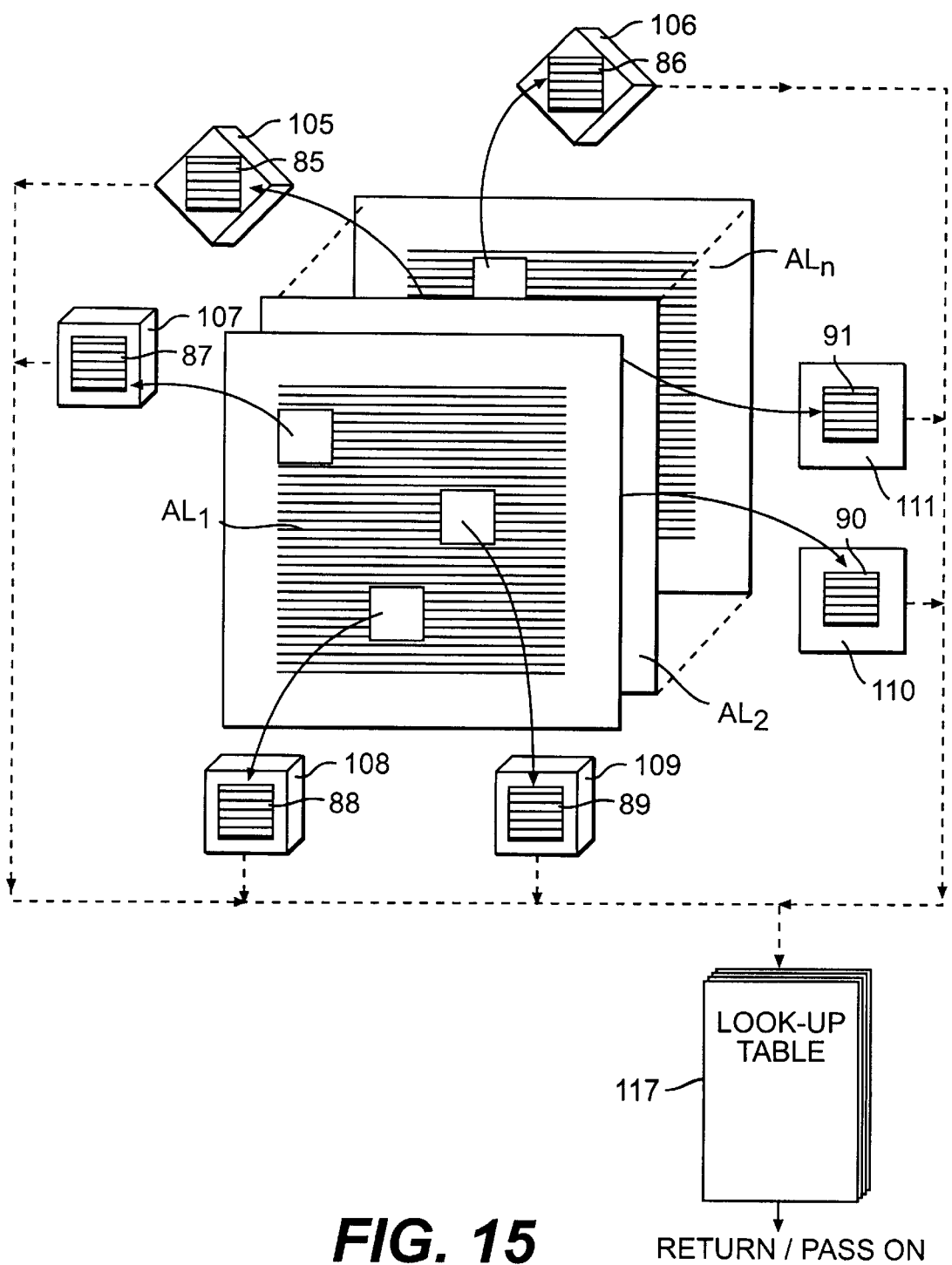
FIG. 15 illustrates machine readable non-overlapping fragments of N-dimensional image domain address spaces.

Turning to FIG. 15, it will be seen that machine readable non-overlapping fragments, such as at 85–91, of N-dimensional image domain address spaces of the above-described type, such as at $AL_1 \ldots AL_n$, can be affixed to a variety of two and three dimensional objects, such as at 105–111, to unique machine readable identifiers of those objects. Typically, these machine readable identifiers (i.e., address space fragments) are registered with the objects to which they are applied in a flat or hierarchically organized look-up table 117 so that a readout of any part of the address space identifier on any of the objects 105–111 provides a pointer for indexing into the look-up table 117. this pointer, in turn, usually causes the look-up table to return and/or pass on predetermined object related information to other system components (not shown).

In practice, the address space fragments 85–91 may be written directly on the objects 105–111, respectively, and/or on other substrates that are subsequently permanently or temporarily affixed to the objects. While a two dimensional address space can be employed for this application, more fully parameterized address spaces, such as the labeled address spaces $AL_1 \ldots AL_n$ have the advantage of having a hierarchical organization which may be employed, as shown, to hierarchically organize object identifiers 85–91 by object type or any other desired classification.

F. Glyph Address Carpets

Figure 16:
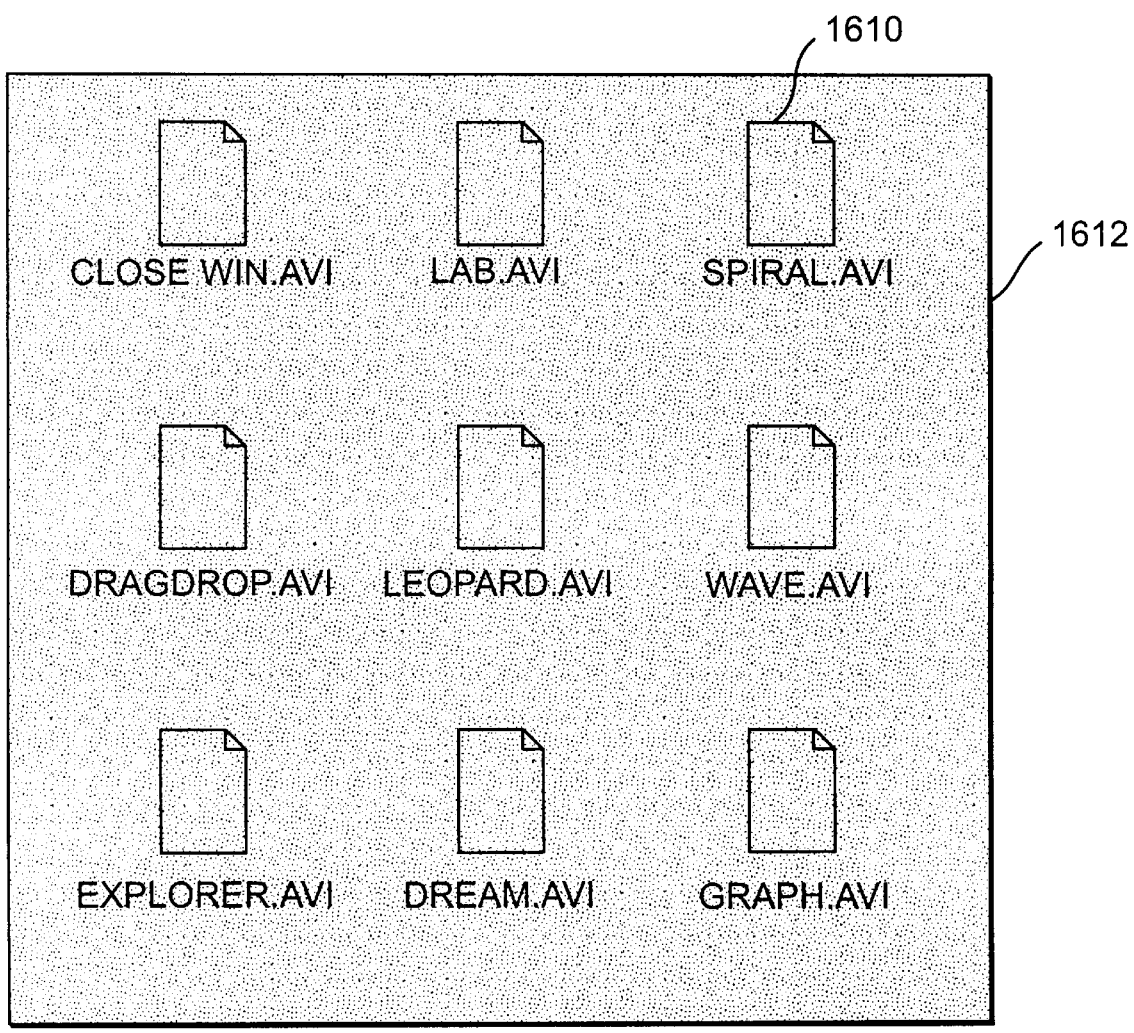
FIG. 16 is a block diagram that shows an example of a user interface implemented using glyph address carpets.

FIG. 16 is a block diagram that shows an example graphical user interface implemented using a glyph address carpet. The interface comprises two components: (1) sensory indicia and (2) a background which comprises a glyph address carpet 1612. The address carpet may be visible or invisible. The sensory indicia in FIG. 16 are preferably visual indicia, and in particular graphic elements, such as icon 1610. The glyph address carpet 1612 is used as the background wallpaper for the graphic elements. The glyph pattern that makes up the background is called an "address carpet" because the glyphs can be decoded to provide unique address information for each location.

The icons may, as shown in FIG. 16, be partially formed by glyphs that are part of the glyph address carpet. In the case of glyphtones (see, e.g., U.S. Pat. No. 5,315,098 to Tow) and serpentones (see, e.g., U.S. Pat. No. 5,706,099 to Curry), the indicia may be substantially composed of the glyphs themselves. Because the glyphs encode address information, a portion of the glyphs can be read optically and decoded to determine a unique address for a local position.

The graphical user interface implemented using glyph address carpets can be implemented on any media capable of displaying the components of the interface. Thus, the interface could be implemented on hardcopy, such as paper, labels, physical objects, and photographic media; on dynamic displays such as a cathode ray tube (CRT) display or liquid crystal display (LCD); or on projected displays from fixed or dynamic media such as a slide projector, or television.

Although the embodiment described herein utilizes glyphs, the glyphs can alternatively be replaced by any system, visible or invisible, that provides a data address code. Whereas the embodiment described herein utilizes visual indicia, the visual indicia can alternatively be replaced by any sensory indicia that could serve to guide a user or machine to select a location while the machine readable data address codes provide an address logical reference. The embodiment described herein utilizes a paper substrate, but the paper substrate can alternatively be replaced by any media in which the data address codes can be embedded and read by a machine.

The sensory indicia may be embedded in the same media as the data address codes or may be embedded in other media. The sensory indicia can alternatively be projected onto glyphs, or glyphs can be projected onto sensory indicia.

Figure 17:
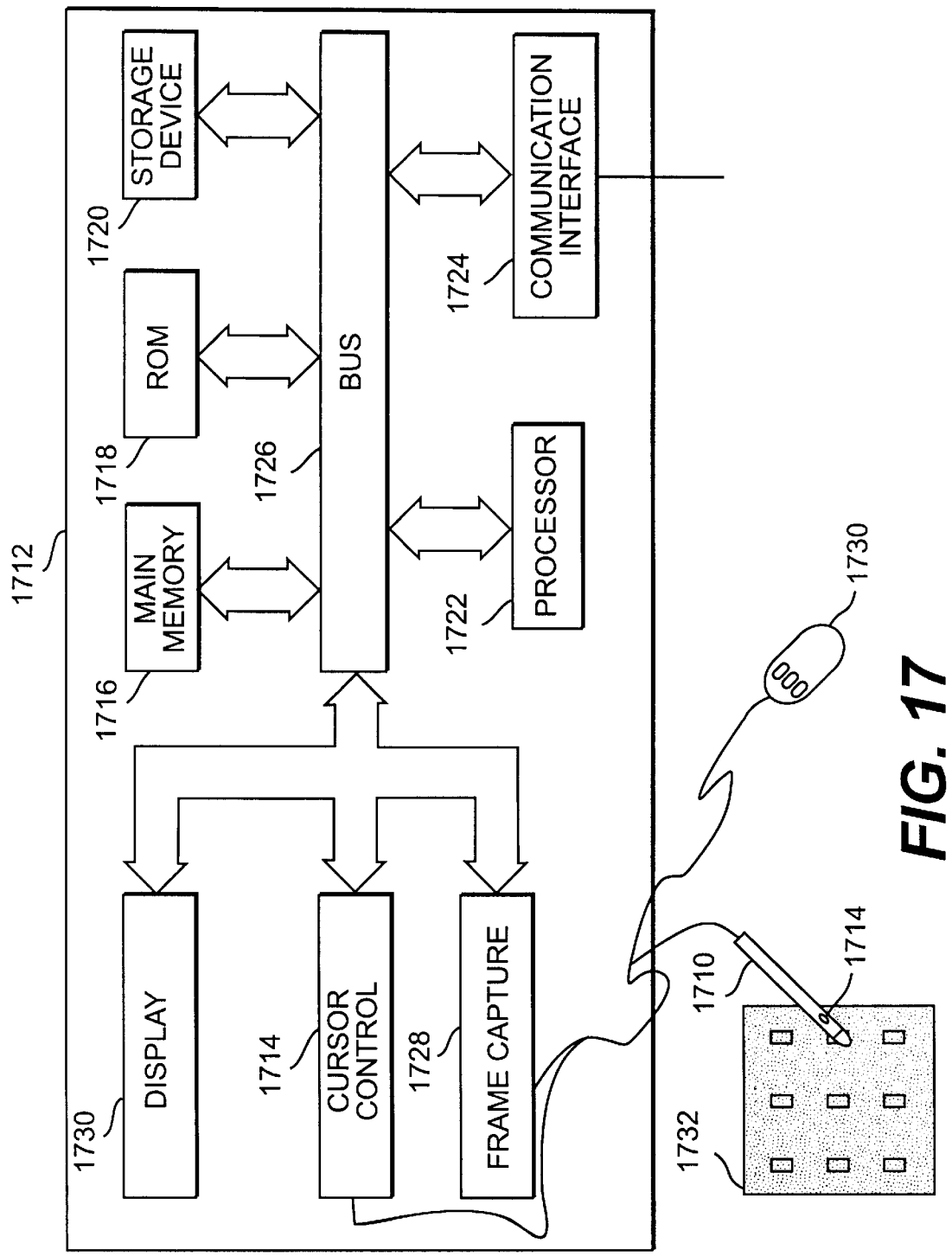
FIG. 17 is a block diagram of an image capture system that may be used to capture a user-selected portion of the glyph address carpet, and decode the glyphs in the captured portion.

FIG. 17 is a block diagram of an image capture system that may be used to capture a user-selected portion of a graphical user interface, such as glyph address carpet 1612, and decode the glyphs in the captured portion. In one embodiment, computer system 1712 is a general purpose computer system, such as a conventional personal computer or laptop computer, that includes main memory 1716, read only memory (ROM) 1718, storage device 1720, processor 1722, and communication interface 1724, all interconnected by bus 1726. Bus 1726 also connects to display 1730, cursor control 1714, and frame capture 1728.

Image capture device 1710, which in this case is a camera pen, is connected to frame capture 1728 and mouse 1730. Camera pen 1710 transmits image information to frame capture 1728. In one embodiment, button 1714 of camera pen 1710 is wired to mouse 1730 so that when a user presses button 1714 a signal travels through the circuitry of mouse 1728 to cursor control 1714. The signal causes processor 1722 to run a program that directs frame capture 1728 to capture the image from camera pen 1710. In another embodiment, both the image line and signal line from camera pen 1710 are input directly into frame capture card 1728. The lines between camera pen 1710 and computer 1712 can be wired in any way that provides capture of the image from camera pen 1710.

The user makes a selection by placing camera pen 1710 on or near visual indicia on glyph address carpet 1732, and pressing button 1714. Pressing button 1714 causes camera pen 1710 to capture the portion of the address carpet under the tip of camera pen 1710, and transmit the image to computer 1712, via frame capture 1728, for analysis. The button or multiple buttons can be used for additional signaling, as in a double click, hold down.

Figure 18:
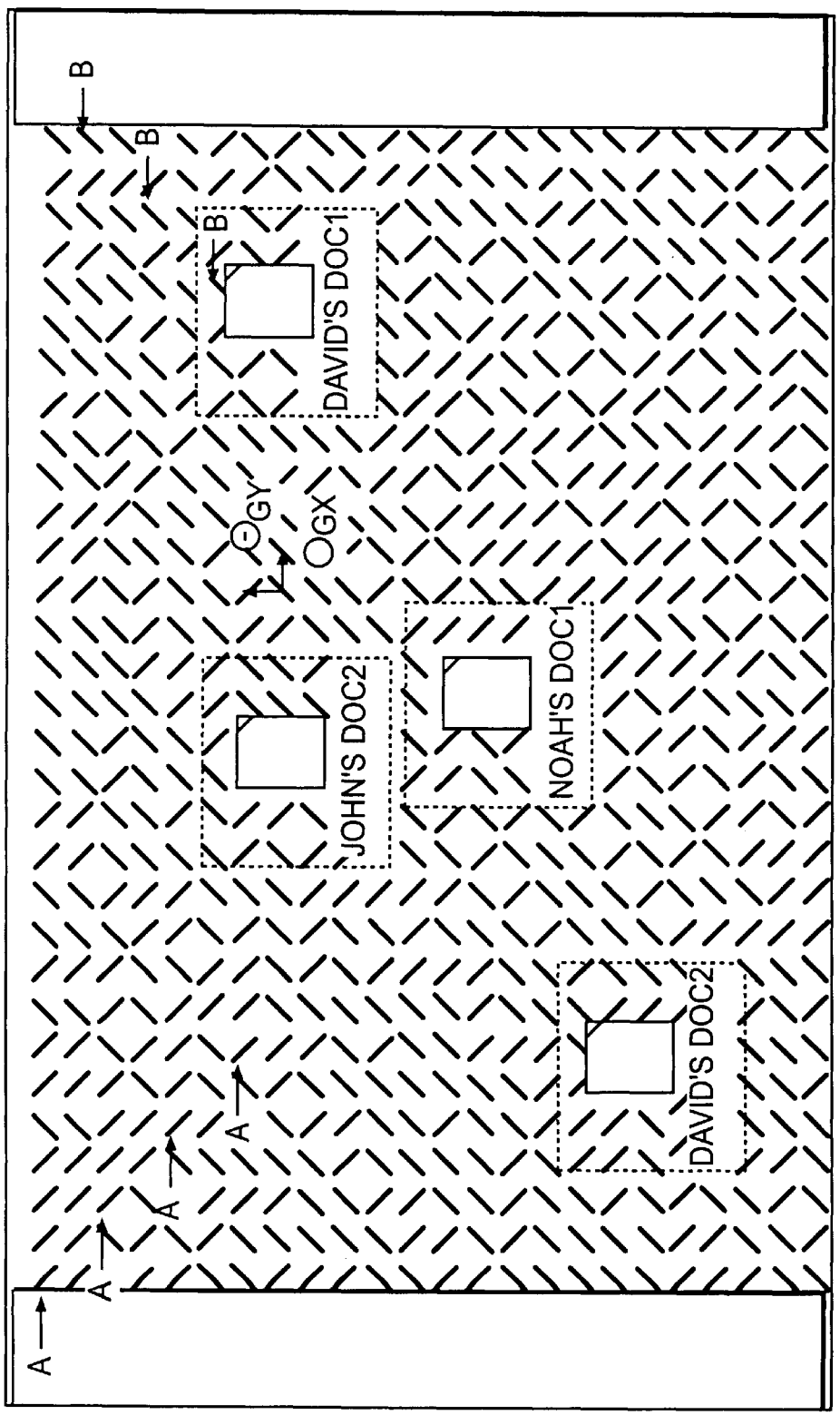
FIG. 18 shows an embodiment of a user interface implementing hot zones.

FIG. 18 shows an embodiment of a user interface implementing hot zones. A hot zone is an area on or near the visual indica that defines selection locations that are equivalent to selecting the same visual indicia. In a preferred embodiment, the hot zone may encompass the visual indicia. For example, in FIG. 18, the icon David's DOC2 has a broken line area indicating a hot zone. If the user makes a selection within this hot zone, the icon "David's DOC2" will be selected. This allows the user to make a selection that is on or near the visual indicia. The selection is treated by the system as if the visual indicia was selected. The hot zone may be explicitly denoted by the visual indicia, including a visually distinct coloring in the address carpet, or may be implicit by appropriate proximity.

FIG. 18 also illustrates a preferred embodiment for the glyph address carpet coding scheme. Each glyph is either a forward slash or a backward slash. The orientation and spacing of the rows and columns of glyphs is indicated by $O_{GX}$ and $O_{GY}$, respectively. As denoted by the As and Bs in the drawing, an A code runs on every other line, and is interlaced with a B code. Along diagonals running down and to the right, every A value is preferably the same. Similarly, along diagonals running down and to the left, every B value is preferably the same.

Figure 19:
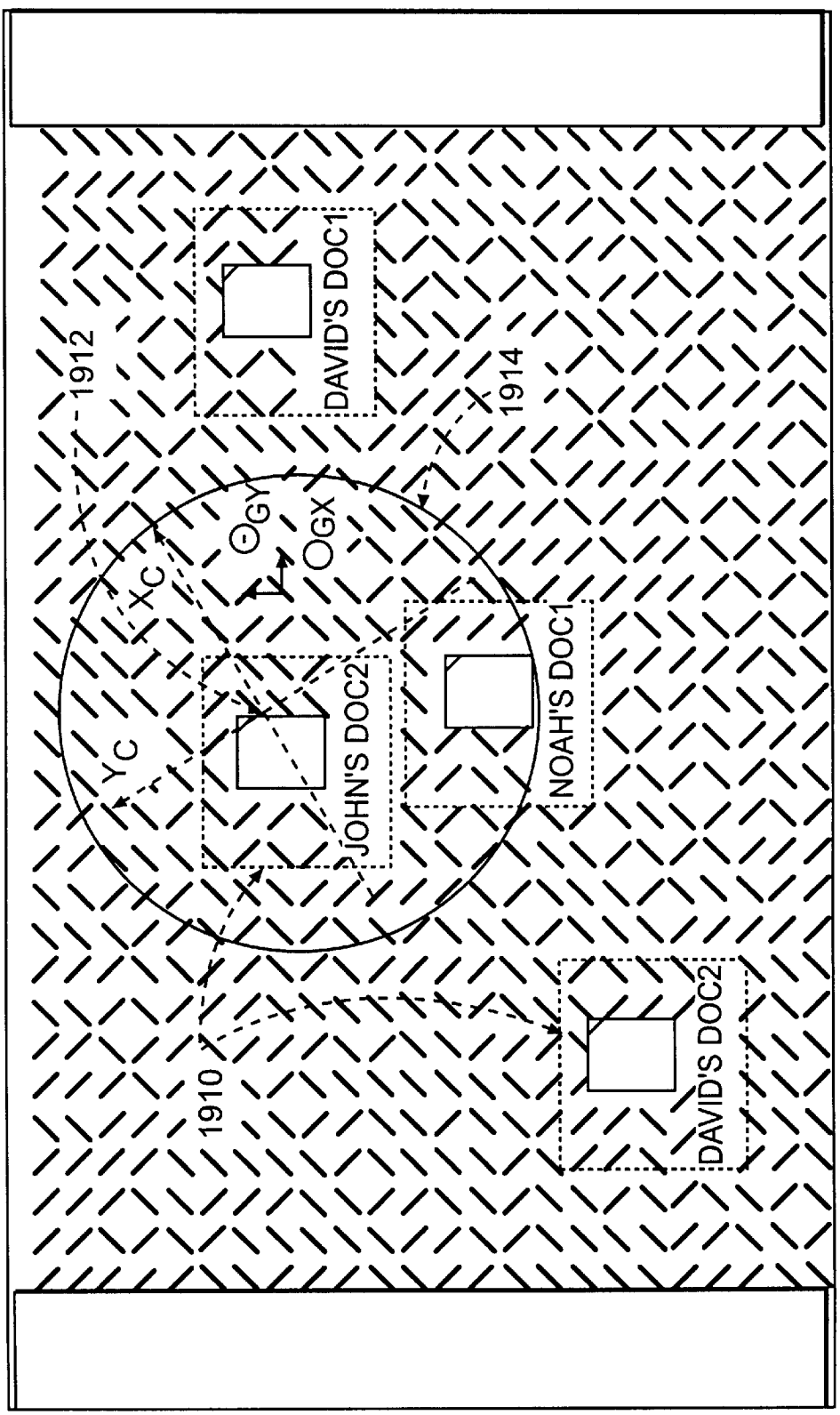
FIG. 19 is a block diagram illustrating the selection process using camera pen 1710.

FIG. 19 is a block diagram illustrating the selection process using camera pen 1710. Each icon has an effective selection area indicated by a broken line hot zone 1910. The tip of camera pen 1710 covers an area indicated by 1914. The orientation of the tip of camera pen 1710 is denoted by the $Y_C$ axis and $X_C$ axis. To make a selection, the user places the tip of camera pen 1710 over the area to be selected. When the user presses button 1714, the image within area 1914 is captured. Computer 1712 analyzes the captured image to determine the location of the center 1912 of selection area 1914. After determining the location of center 1912, the location of center 1912 is used to look up a function corresponding to center 1912.

Figure 20:
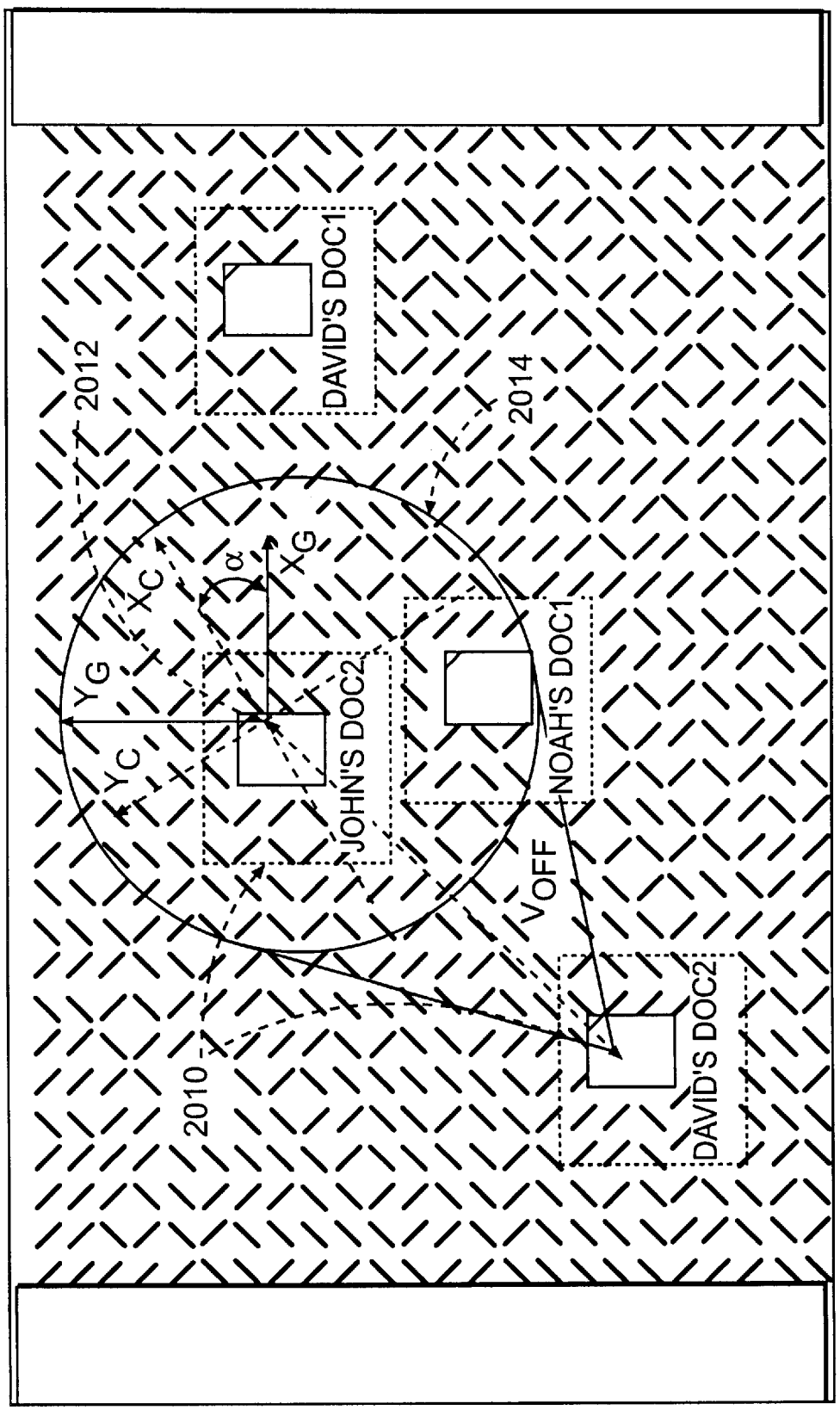
FIG. 20 is a block diagram illustrating a second type of selection process that may be used to implement a graphical user interface consistent with the principles of the invention

FIG. 20 is a block diagram illustrating a second type of selection process that may be used to implement a graphical user interface consistent with the principles of the invention. In this embodiment, camera pen 1710 has a pointing device attached to the tip, thus making the image capture area of the pen offset from the location pointed at by the user. For example, in FIG. 20, a user selects the icon "David's DOC" by pointing to the icon, but the camera pen 1710 image capture area 2014, with center 2012, is offset from the icon. In this case, computer 1712 must determine the actual selection based on 1) the image area 2014, and 2) the orientation of the selected area, and 3) the offset distance and direction from the image capture area from center 2012. The offset calculation utilizes the glyph lattice parameters from the captured image decoding process described below.

Returning to FIG. 17, in one embodiment, main memory 1716 is a random access memory (RAM) or a dynamic storage device that stores instructions executed by processor 1722. Main memory 1716 may also store information used in executing instructions. ROM 1718 is used for storing static information and instructions used by processor 1722. Storage device 1720, such as a magnetic or optical disk, also stores instructions and data used in the operation of computer system 1712.

Display 1730 may be a CRT or other type of display device. Cursor control 1714 controls cursor movement on display 1730. Cursor control 1714 may be, for example, a mouse, a trackball or cursor direction keys.

The system shown in FIG. 17 can be used to implement the glyph address carpet capture and translation system described herein. The apparatus and methods described herein may be implemented by computer system 1712 using hardware, software, or a combination of hardware and software. For example, the apparatus and methods described herein may be implemented as a program in any one or more of main memory 1716, ROM 1718, or storage device 1720. In one embodiment, processor 1722 executes programs which analyze captured portions of a glyph address carpet to determine address information encoded in the glyphs.

Such programs may be read into main memory 1716 from another computer-readable medium, such as storage device 1720. Execution of sequences of instructions contained in main memory 1716 causes processor 1722 to perform the process steps consistent with the present invention described herein. Execution of sequences of instructions contained in main memory 1716 also causes processor to implement apparatus elements that perform the process steps. Hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1722 for execution. Such a medium may take many forms, including but not limited to, non-volatile memory media, volatile memory media, and transmission media. Non-volatile memory media includes, for example, optical or magnetic disks, such as storage device 1720. Volatile memory media includes RAM, such as main memory 1716. Transmission media includes coaxial cables, copper wire and fiber optics, including the wires that comprise bus 1726. Transmission media can also take the form of acoustic or light waves, such as those generated during radiowave and infrared data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, LAW OFFICES a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 1722 for execution. For example, the instructions may initially be carried on a magnetic disk or a remote computer. The remote computer can load the instructions into its dynamic memory and send the instructions over a telephone line using a modem. A modem local to computer system 1712 can receive the data on the telephone line and use an infrared transmitter to convert the data to an infrared signal. An infrared detector coupled to appropriate circuitry can receive the data carried in the infrared signal and place the data on bus 1726. Bus 1726 carries the data to main memory 1716, from which processor 1722 retrieves and executes the instructions. The instructions received by main memory 1716 may optionally be stored on storage device 1720 either before or after execution by processor 1722.

Computer system 1712 also includes a communication interface 1724 coupled to bus 1726. Communication interface 1724 provides two way communications to other systems. For example, communication interface 1724 may be an integrated services digital network (ISDN) card or a modem to provide a data communication connection to a corresponding type of telephone line. Communication may also be, for example, a local area network (LAN) card to provide communication to a LAN. Communication interface 1724 may also be a wireless card for implementing wireless communication between computer system 1712 and wireless systems. In any such implementation, communication interface 1724 sends and receives electrical, electromagnetic or optical signals that carry data streams representing various types of information.

The link between communication interface 1724 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the "Internet". Local networks and the Internet both use electrical, electromagnetic or optical signals that carry digital data streams. The signals through the various networks and the signals between the networks and communication interface 1724, which carry the digital data to and from computer system 1712, are exemplary forms of carrier waves transporting the information.

Computer system 1712 can send messages and receive data, including program code, through the network(s) via the link between communication interface 1724 and the external systems and devices. In the Internet, for example, a server might transmit a requested code for an application program through the Internet, an ISP, a local network, and communication interface 1724.

Program code received over the network may be executed by processor 1722 as it is received, and/or stored in memory, such as in storage device 1720, for later execution. In this manner, computer system 1712 may obtain application code in the form of a carrier wave.

Figure 21:
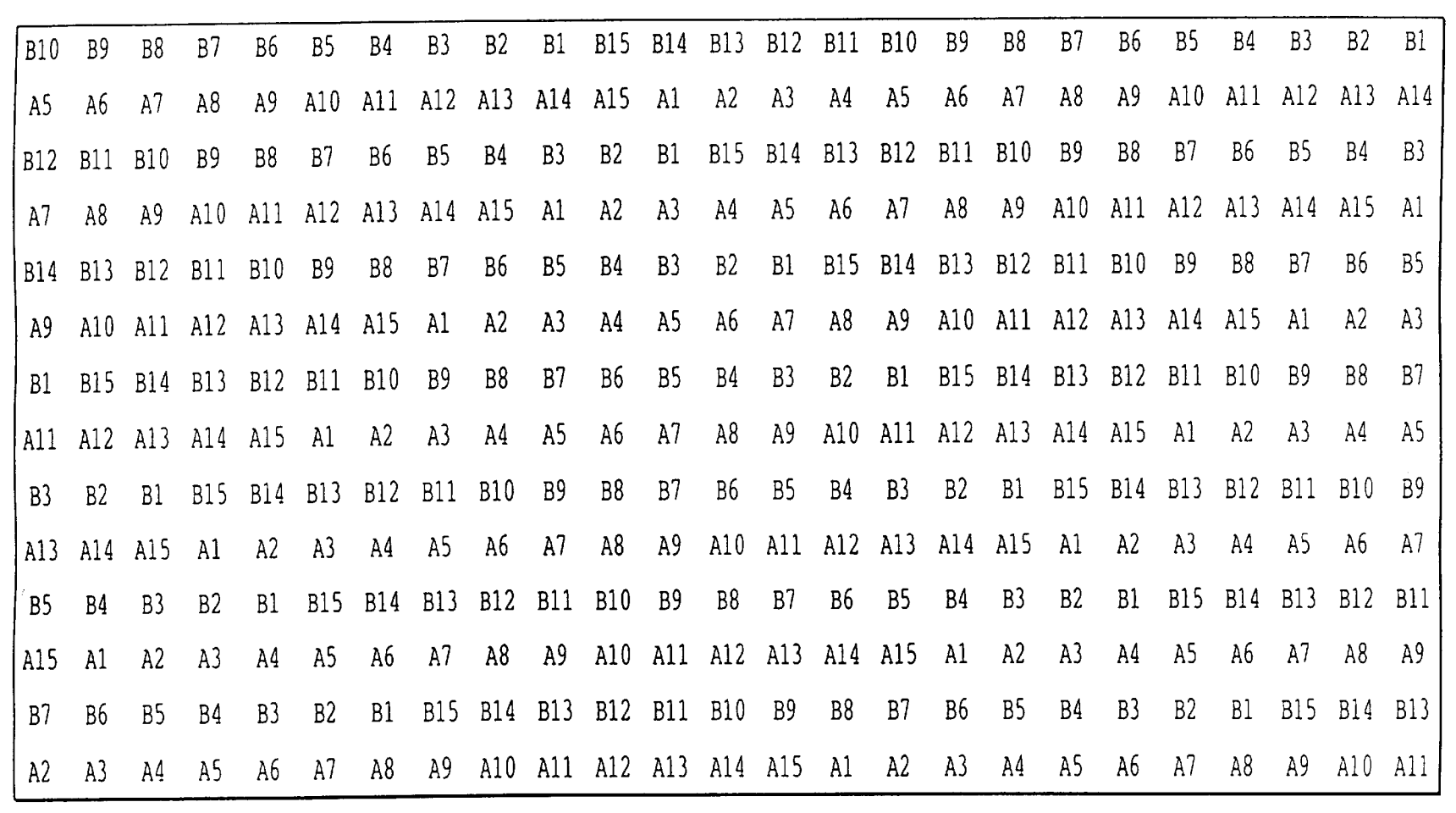

FIG. 21 illustrates an embodiment of the address codes encoded in the glyph address carpet 1732. More particularly, FIG. 21 illustrates one section of the glyph address carpet. The addresses are encoded by alternating rows of "A" address code sequences and "B" address code sequences. The position along each sequence in each row should be unambiguously determinable from a predetermined length subsequence. For example, an N-bit shift register maximal length code can be uniquely determined in position from an N-bit subsequence. Each address code sequence is a fifteen bit sequence, with the A sequence indexed running left to right, and the B sequence indexed running in a reverse direction, right to left. Each row of A code sequences is offset by two glyph positions relative to the previous and next row of A addresses. Similarly, each row of B code sequences is offset in the opposite direction by two positions. Thus, the encoding scheme has two key characteristics: parallel rows including two sets of one-dimensional unique address codes and relative offsets among members of the two sets so that the offset between each pair from the two sets is unique. This establishes two-dimensional unique address locations.

Computer 1712 decodes address information encoded in the glyphs by analyzing the captured image area in two steps. Ideally, the user places camera pen 1710 over a portion of glyph address carpet 1732 and capture an image angularly aligned as shown in the pattern of bits shown in FIG. 21. In reality, however, the user variably orients the camera pen 1710 over an area of interest, so the pattern could be oriented anywhere from 0° to 360°. Therefore, the computer 1712 must first determine the orientation of the image as part of decoding and interpreting the address information.

The orientation of the image is determined by analyzing the captured image. This process is called disambiguation. (See, e.g., U.S. Pat. No. 5,521,372 to Hecht et al.). After determining the proper orientation of the image, computer 1712 decodes the address of the selected location in the address carpet. The disambiguation and address decoding processes performed by computer 1712 will now be described in greater detail.

G. Disambiguation and Address Decoding

Figure 22A:
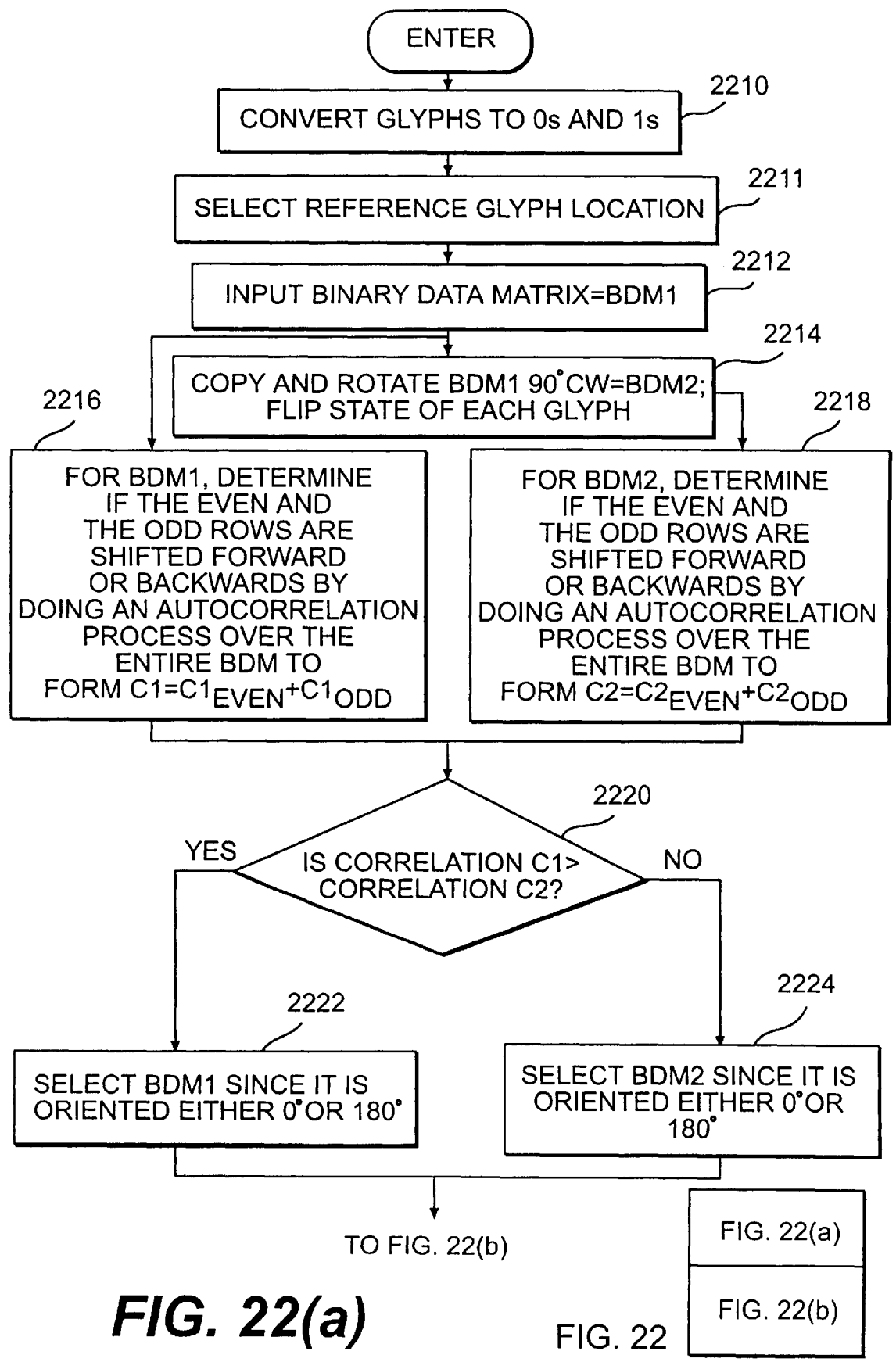

FIG. 22(*a*) and FIG. 22(*b*) form a flow chart showing the disambiguation and address decoding processes performed by computer 1712 on the captured image area. Computer 1712 begins the disambiguation process by image processing the captured portion of the address carpet to find a glyph seed. A glyph seed is a first-identified glyph having readable glyphs around it. Once a glyph seed has been found, the glyph lattice can be determined by processing neighbors of the glyph seed. (See Appendices A and B). The glyphs are then decoded as 1's or 0's, which are filled into a binary data matrix having rows and columns corresponding to the glyph lattice rows. The orientation may still be ambiguous with respect to 90° and 180° rotations.

FIG. 23 illustrates a binary data matrix (BDM) 2310 formed from a glyph lattice captured by camera pen 1710. The BDM has locations corresponding to the glyph lattice. Thus the size of the BDM corresponds closely to the size of the glyph lattice.

Each location of the glyph lattice is analyzed to determine which value should be placed in the corresponding location of the BDM. Initially, the BDM is filled with a value, for example $\phi$, which indicates that no attempt has been made to read the glyph. Once the glyph corresponding to a particular location has been analyzed, the $\phi$ is replaced by a value indicating the result of the glyph analysis.

In FIG. 23, a B indicates a border location; an X indicates that no interpretable glyph was found at the corresponding location of the glyph lattice; an E indicates a glyph at the edge of the captured image portion; a 0 indicates a back slash glyph; and a 1 indicates a forward slash glyph. The area of the matrix corresponding the captured image is filled with 0s and 1s, the edge is bounded by Es, and the Xs correspond to locations that have no readable glyphs. In practice, however, although the BDM will generally have a similar pattern, the values will often not be as evenly distributed. For example, a glyph location within the captured image area might result in an X if the glyph has been obliterated. Several values have been drawn with circles and squares around them to illustrate the two separate code sequences that are staggered in opposite directions.

When a user makes a selection, the user might orient the camera pen in virtually any direction on the user interface. The captured image could be oriented at any angle. Thus, even though step 2210 allows computer 1712 to derive a BDM of 0s and 1s from the captured image, it is uncertain whether the BDM is oriented at 0° (i.e., correctly oriented), 90°, 180°, or 270° relative to the original code pattern in the glyph address carpet from which the image was captured. Until the orientation of the captured image is determined, it is not possible to derive the correct address code from the BDM. The orientation could be provided by auxiliary information such as physical system constraints. However, the orientation can be uniquely determined directly from the address codes.

After converting the glyphs to 0s and 1s, a reference glyph location is selected (step 2211). This location may be chosen in a variety of ways, but is typically a location which represents the selection. For example, the reference glyph location could be at the center of the BDM.

After the image has been converted to a BDM, it is processed by computer 1712 (step 2212). The original BDM developed from the captured image is referred to as BDM1. Computer 1712 makes a copy of BDM1 and rotates the copy clockwise 90° to form a second binary data matrix, BDM2 (step 2214). By rotating BDM1 by 90°, the rows of BDM1 become the columns of BDM2, and the columns of BDM1 become the rows of BDM2. Additionally, all bit values in BDM2 are flipped from 0 to 1, and 1 to 0, because a 45° slash glyph rotated 90° appears as the opposite state of the non-rotated glyph.

Computer 1712 then performs a correlation separately on the odd and even rows of BDM1 (step 2216) to determine whether code in the rows are staggered forward or backward. The correlation is also performed for the odd and even rows of BDM2 (step 2218). The correlation is performed over all the rows of each BDM, and results in correlation value C1 for BDM1 and correlation value C2 for BDM2.

Figure 24:
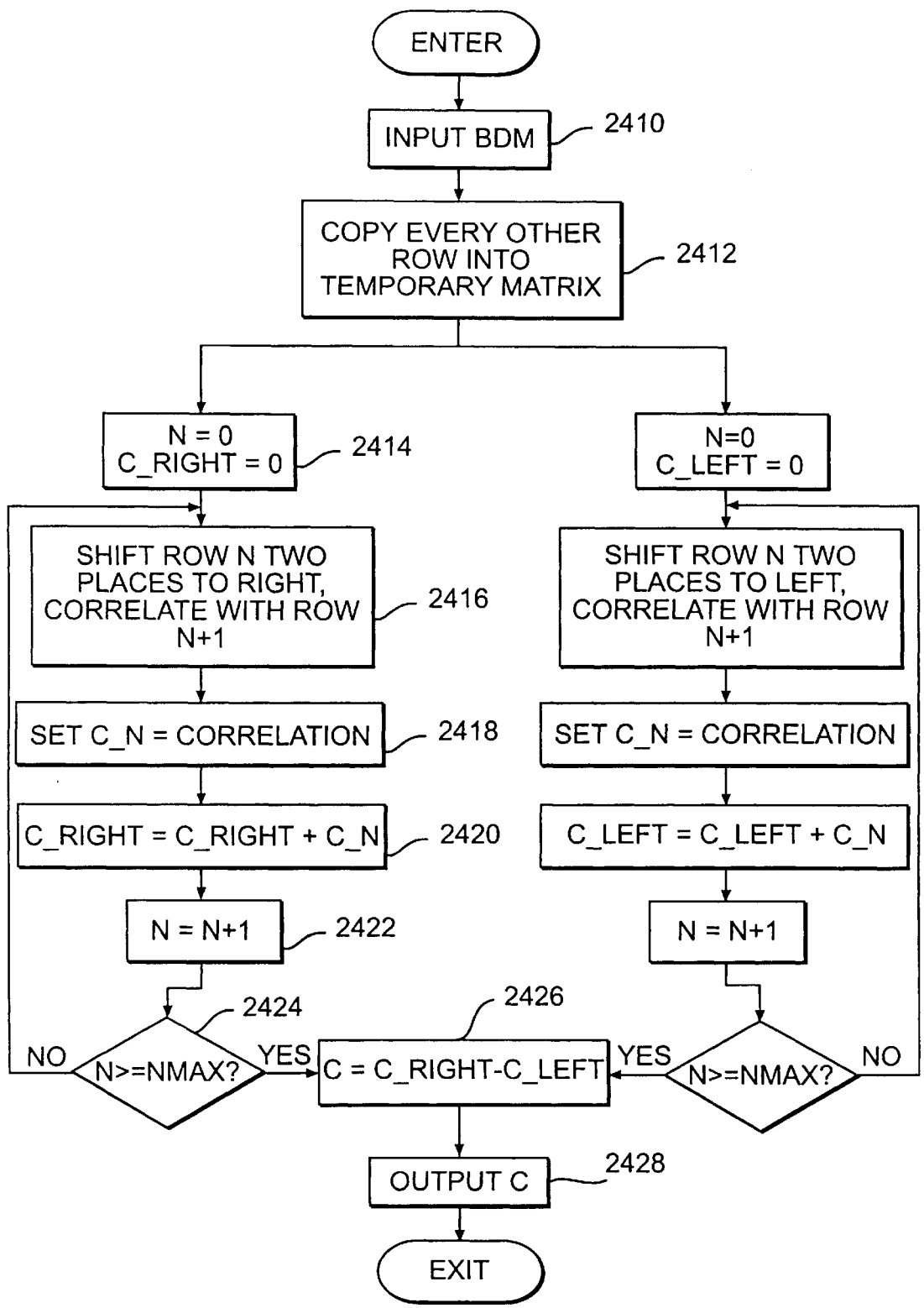
FIG. 24 is a flowchart showing the process for performing correlation steps 2116 and 2118.

FIG. 24 is a flowchart showing an embodiment of correlation steps 2216 and 2218 of FIG. 22(b). The process determines a correlation value for every other line of a BDM along diagonals in each direction, and sums the row correlation values to form a final correlation value for the odd or even rows. The process is performed on the odd rows of BDM1 to form correlation value $C1_{ODD}$ for BDM1, the even rows of BDM1 to form correlation value $C1_{EVEN}$ for BDM1, the odd rows of BDM2 to form correlation value $C2_{ODD}$ for BDM2, the even rows of BDM2 to form correlation value $C2^{EVEN}$ for BDM2. The BDM that is oriented at 0° or 180° will have a larger $C_{ODD}+C_{EVEN}$ than the other BDM.

Computer 1712 first inputs the BDM (step 2410), and then copies every other row to a temporary matrix (step 2412). Identical processes are then performed for diagonals to the right and to the left. Steps 2414, 2416, 2418, 2420, 2422 and 2424 process the diagonals to the right. For example, in FIG. 25 the steps correlate along the diagonals moving from the upper left to lower right. First, row count N and correlation value C_RIGHT are each initialized to zero (step 2414). Row N is shifted two places to the right, and correlated with the next row (step 2416). C_N is then set to this value (step 2418). C_RIGHT is then set to C_RIGHT+C_N (step 2420), and N is incremented (step 2422). If row count N>=Nmax, where N is the number of odd or even rows in the BDM, then the process proceeds to step 2426. If N is not greater than or equal to Nmax, the process continues at step 2416. Thus, after the process has correlated each adjacent row, the correlation value C_RIGHT indicates the strength of the correlation along the diagonals to the right.

The steps on the right of FIG. 24 are similar to steps 2414, 2416, 2418, 2420, 2422 and 2424, but process diagonals running from the upper right to lower left to develop correlation value C_LEFT. After correlating the right and left diagonals to determine C_RIGHT and C_LEFT, a final correlation value C is determined by subtracting C_LEFT from C_RIGHT. For example, if odd rows for BDM1 are processed, the C value becomes $C1^{-ODD}$ for BDM1.

The process steps of FIG. 24 are performed for the odd and even rows of BDM1 and the odd and even rows of BDM2. From this information, the correlation value C1 for BDM1 is set to $C1_{EVEN}+C1_{ODD}$ (as determined by FIG. 24 for the rows of BDM1), and the correlation value C2 for BDM2 is set to $C2^{EVEN}+C2_{ODD}$ (as determined by FIG. 24 for the rows of BDM1).

Figure 25:
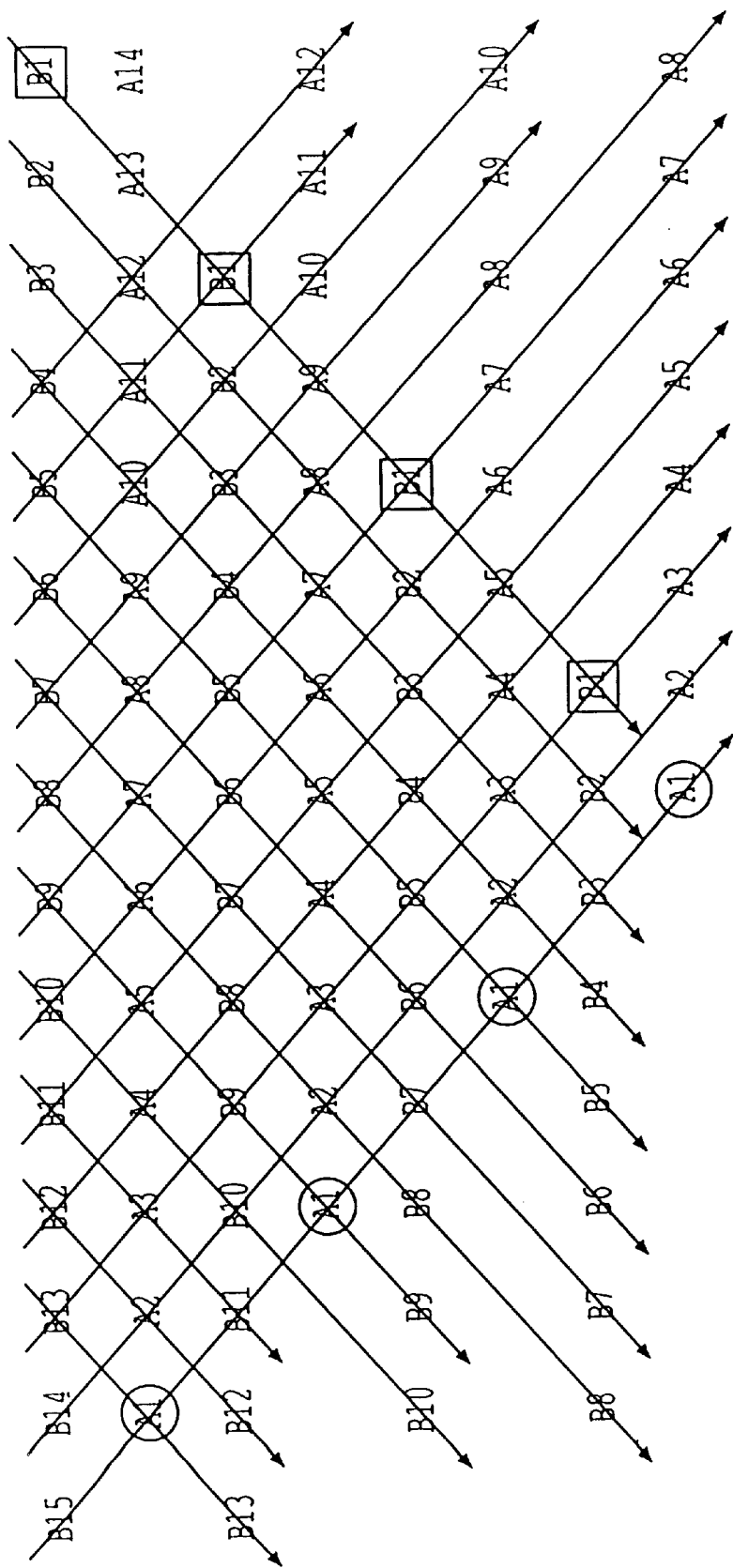
FIG. 25 illustrates the analysis performed by computer 1712 to determine the address encoded by the glyphs of the captured image.

FIG. 25 illustrates why the correlations determine which way the codes in every other row are shifting. For example, as indicated by the circled A1s along the diagonals running to the right, the codes along the diagonal starting at A1 in the first position of the second row should have the same value in every other row along the diagonal, except for erasures and errors. Similarly, as indicated by the boxed B1s, the codes along the diagonal starting at B1 in the upper right corner should have the same value in every other row along the diagonal, except for erasures or errors. This is true for each value along the diagonal in the odd rows running respectively from B2, B3, . . . in the top row. Thus, the strong correlations along the diagonals running down and to the left on the odd rows, and the strong correlations along the diagonals running down and to the right on the even rows indicate that the codes in the even rows are shifting to the right, and the codes in the odd rows are shifting to the left.

For each BDM, therefore, four correlation values are developed: 1) odd rows, right to left, 2) odd rows, left to right, 3) even rows, right to left and 4) even rows, left to right. From these correlation values, the strongest correlation value for the even rows, and strongest correlation value for the odd rows is chosen, and these become $C_{EVEN}$ and $C_{ODD}$ for that BDM (steps 2216 and 2218). $C_{EVEN}$ and $C_{ODD}$ are then added to form a final C correlation value for that BDM. As discussed above with respect to step 2220, the BDM with the strongest correlation value is the BDM that is oriented at either 0° or 180° because of the relative orientation of the codes in the odd and even rows. Thus, two aspects of the chosen BDM are now established: which direction every other line of codes is staggered, and that the BDM is oriented horizontally, at either 0° or 180°. Another correlation process, step 2230 is performed to determine which direction the code in each line runs (as opposed to which way the code is staggered).

The codes in the odd lines are staggered in one direction, and the codes in the even lines are staggered in the other. This staggering property of the code, in conjunction with knowing the respective codes that run in the odd lines and even lines, allows determination of the proper 0° orientation of the BDM.

Returning to FIG. 22(a), if C1 is greater than C2 (step 2220), then BDM1 is selected for further processing. C1 being greater than C2 indicates that the one-dimensional codes of BDM1 are most strongly correlated and are, therefore, oriented at either 0° or 180° (step 2222). If C2 is greater than C1, then BDM2 is selected for further processing, because the higher correlation indicates that BDM2 is oriented at either 0° or 180° (step 2224). Thus, the correct BDM has been found. Before determining the address location of the captured image, however, computer 1712 must first determine whether the selected BDM is at 0° (i.e., oriented correctly), or rotated by 180°.

FIG. 22(b) is a flowchart showing the steps of how computer 1712 determines the address of the captured area of the glyph carpet. Preferably, bit positions along a diagonal in the BDM, when the BDM is oriented at 0°, have the same value at every other row. The image capture process and interference from the visual indicia, however, may result in errors and erasures in the BDM data. To reduce the impact of these errors and erasures, computer 1712 performs a majority vote along each diagonal of the odd rows in the direction the odd rows are staggered, and repeats the majority vote process for even rows along the each diagonal in the direction the even rows are staggered (step 2225). This results in a first code sequence for the odd rows and a second code sequence for the even rows. To the extent the majority vote correctly determines each bit position, the first and second code sequences should match a subsequence of the original pseudo noise address sequence respectively corresponding to the odd or even set of rows.

Computer 1712 then retrieves the original pseudo noise address code (Get Code 1) for rows staggered forward (step 2226), and retrieves the original pseudo noise address code for (Get Code 2) for rows staggered backward (step 2228). Using the original pseudo noise address code for each code set A and B, and the code from the majority voting, computer 1712 performs four cross correlations (step 2230) to establishes the best match of the glyph sequence with the PN sequence location for the odd and even rows.

More particularly, two adjacent rows of the BDM closest to the reference element chosen in step 2211 are correlated with the respective complete PN sequences that created the original address carpet. The PN sequences could be identical. A forward and backward correlation is performed for each row. The four correlations develop four pairs of peak correlation and position values:

1) P1, V1, respectively representing the peak correlation value and corresponding position for Code 1 correlated backwards with the complete PN sequence;

2) Q1, U1, respectively representing the peak correlation value and corresponding position for Code 2 correlated forwards with the complete PN sequence;

3) P2, V2, respectively representing the peak correlation value and corresponding position for Code 1 correlated forwards with the complete PN sequence; and 4) Q2, U2, respectively representing the peak correlation value and corresponding position for Code 2 correlated backwards with the complete PN sequence.

The $U_i$ and $V_i$, position values, where i=1 or 2, corresponding to the peak magnitudes are used to determine the X and Y values corresponding to the reference element chosen in step 2211. Thus, if (P1+Q1)>(P2+Q2) (step 2232), then U1 and V1 are used to calculate the X, Y position of the reference glyph location chosen in step 2211 (step 2236). If (P1+Q1)<=(P2+Q2) (step 2232), then U2 and V2 are used to calculate the X, Y position of the reference glyph location chosen in step 2211 (step 2234). The address information is determined in accordance with the following equations:

$$X=(V_i-U_i+\text{length of full code})/2$$

$$Y=(V_i+U_i-\text{length of full code})/2$$

The calculated X, Y position is then returned (step 2238). Note that diagonals correspond to constant values of U and V, respectively, while rows and columns correspond to constant X and Y. Note also that U and V could be used directly as address parameters.

Thus, an X, Y value associated with the reference point chosen in step 2211 has been determined. Using this information, computer 1712 associates the X, Y coordinates with a logical reference, or a combination of a logical reference and a control signal (e.g., a button click), with a particular operation to be performed. For example, the X, Y coordinates could be used as an index into a table of operations performable by computer 1712 or other device under direction of computer 1712. The X, Y coordinates could be associated with a file open command that opens a file associated with an icon located near the X, Y coordinates in the address space. Virtually any operation that can be performed by computer 1712 could be associated with a particular X, Y coordinate, or range of X, Y coordinates.

Figure 26:
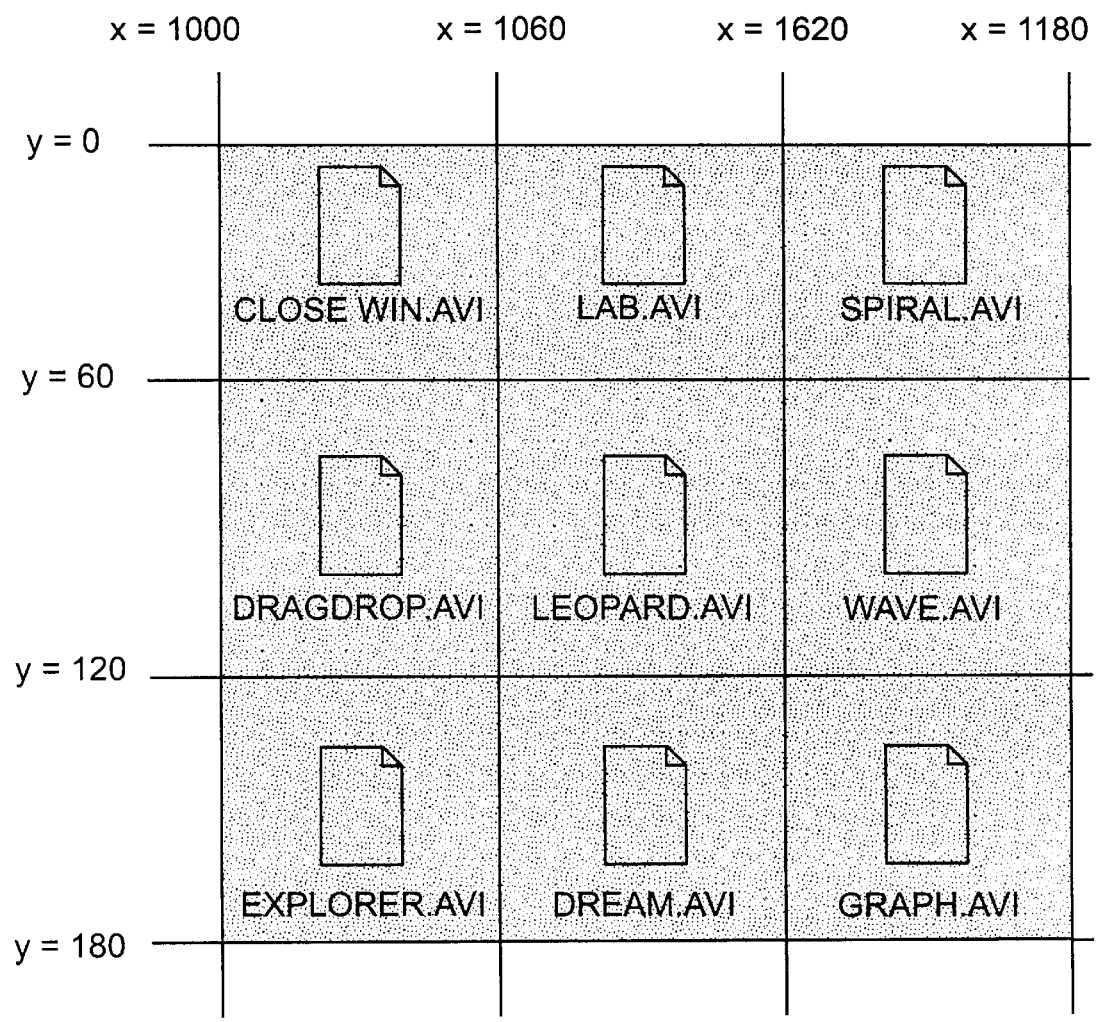
FIG. 26 illustrates the how the address carpet 12 is divided into areas having respective ranges of addresses.

FIG. 26 illustrates an embodiment of a user interface in which address carpet 12 is divided into hot zones having respective ranges of addresses corresponding to a graphic object which in turn corresponds to a system object or function. Computer 1712 uses the X,Y address determined from the image capture to determine which area of address carpet 12 was selected by the user. For example, if the address is X=1052 and Y=32, which is in the upper left area of address carpet 12, then the user has selected CloseWin.avi. Computer 1712 utilizes a table that associates X, Y coordinates to one or more functions that are to be performed based on the X, Y coordinates. For example, in the above example, X=1052 and Y=32 would be associated with the one or more functions to be performed when a user selects CloseWin.avi. Activation could be signaled to computer 1712 by button 1714, such as a click or multiple click. Alternatively, activation could be signaled to computer 1712 by holding the image capture steady for a certain time. The precision of location selection is one glyph unit and the resolution of differentiated selection can be as fine as one glyph unit. Resolution can be extended to a fraction of a glyph unit provided the capture selection device can be referenced to the address carpet to within a fraction of a glyph interval. For example, a camera pixel is typically fraction of a glyph interval.

H. Camera Pen

FIGS. 27(a), 27(b), and 27(c) show front, side and top views, respectively, of one embodiment of camera pen 1710 of FIG. 17. The pen includes a camera 2716 encased in case 2718. Case 2718 has a button 2710, switch 2714, and landing gear 2712 attached thereto. Button 2710, when pressed by a user, activates switch 2714 to signal computer 1712 that an image is to be captured. Landing gear 2712 is a rigid or skeletal stricture, and is angled so as to allow a user to hold the pen against a substrate at a natural ergonomic angle, similar to a pen with a predetermined working distance from the substrate to the face of the camera lens on camera 2716.

FIGS. 28(a) and 28(b) show side and front views, respectively, of another embodiment of camera pen 1710 of FIG. 17. The pen is comprised of camera 2814 encased in case 2818. Case 2818 has a switch 2812 and landing gear 2810 attached thereto. Switch 2812 is activated by a user pressing down on button 2812, which activates switch 2816 to signal to computer 1712 that an image is to be captured. Landing gear 2810, like the landing gear 2712 of FIG. 27, is angled so as to allow a user to hold the pen against a substrate at a natural ergonomic angle, similar to a pen. Landing gear 2810, however, is a clear or translucent truncated cone in the embodiment shown in FIG. 28.

In either the skeletal or clear cone embodiment, the landing gear of the camera pen may include selection assistance elements, such as marks or protrusions, that are used by the user to select an area of the image. For example, the landing gear might include cross hairs, a printed arrow, or a protruding nub, that a user places over or on the area being selected.

I. Selection Alternatives

The embodiments described have used a device like camera pen 1710 to capture a portion of glyph carpet associated with a selection. Other selection apparatus may also be used. In general, any device may be used that identifies selection location to a user or machine and provides a corresponding registered image capture portion of the address carpet.

Figure 29:
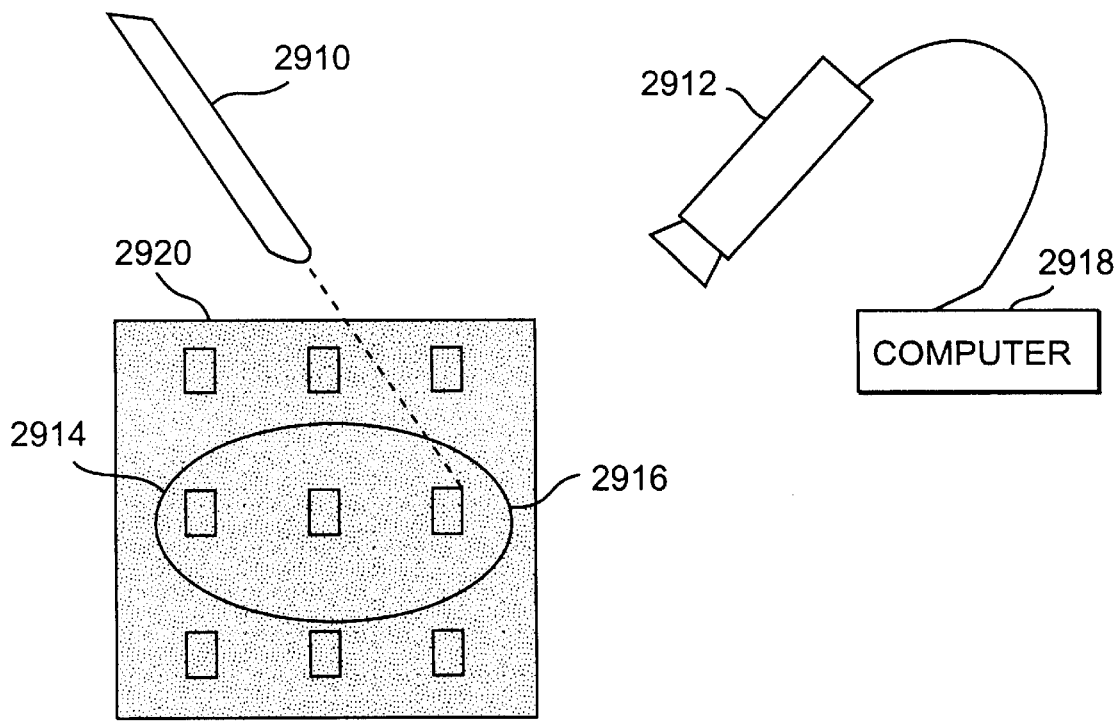
FIG. 29 is a block diagram showing glyph address carpet image capture based on selection using a laser pointer.

FIG. 29 is a block diagram that illustrates a glyph address carpet 2920, which can be read by a pan and zoom camera 2912. The captured portion of glyph address carpet 2920 can then be processed by computer 2918. Camera 2912 scans glyph address carpet 2920 for an area 2916 on glyph address carpet 2920 pointed to by handheld laser pointer 2910. Camera 2912 captures the portion of the glyph address carpet being pointed at and transmits the portion to computer 2918 for processing in response to the selection. Alternatively, or additionally, camera 2912 could capture wide area 2914 for processing. The computer image processing recognizes the pointer location by conventional image recognition techniques.

Figure 30:
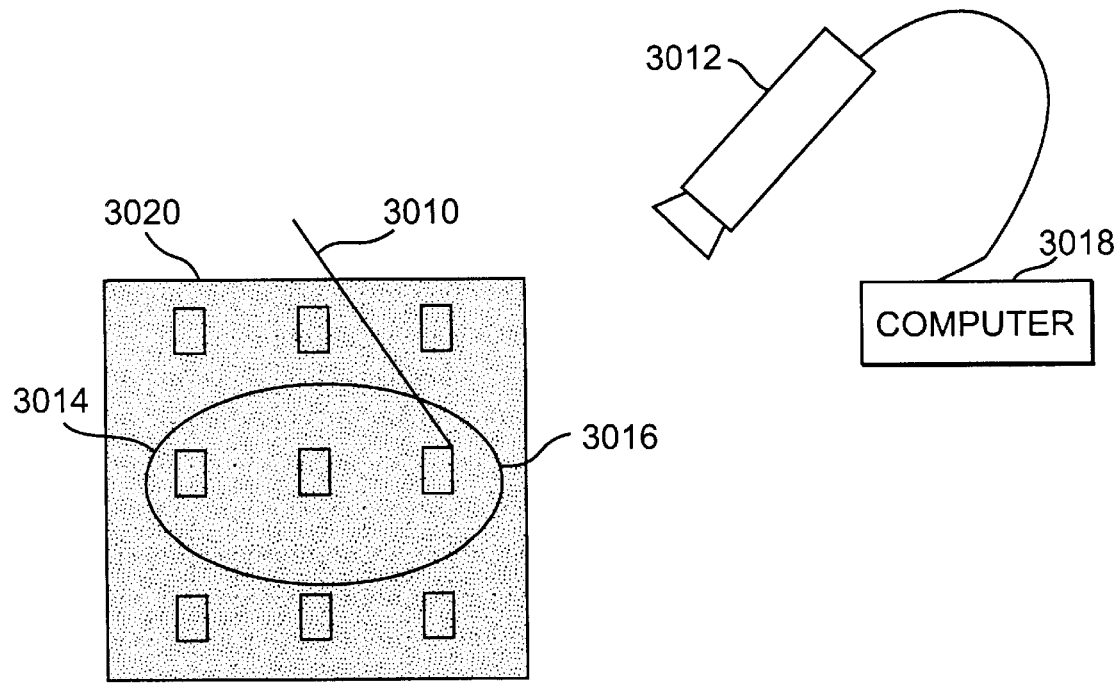
FIG. 30 is a block diagram showing glyph address carpet image capture based on selection using a handheld pointer.

FIG. 30 is a block diagram that illustrates a glyph address carpet 3020, which can be read by a pan and zoom camera 3012. The captured portion of glyph address carpet 3020 can then be processed by computer 3018. Camera 3012 scans glyph address carpet to determine whether handheld pointer 3010 is pointing to an area 3016 on glyph address carpet 3020. If handheld pointer 3010 is pointing to an area, camera 3012 captures the portion of the glyph address carpet near the area being pointed at, and transmits the captured portion to computer 3018. Alternatively, or additionally, camera 3012 could capture wide area 3014 for processing in response to the selection.

Figure 31:
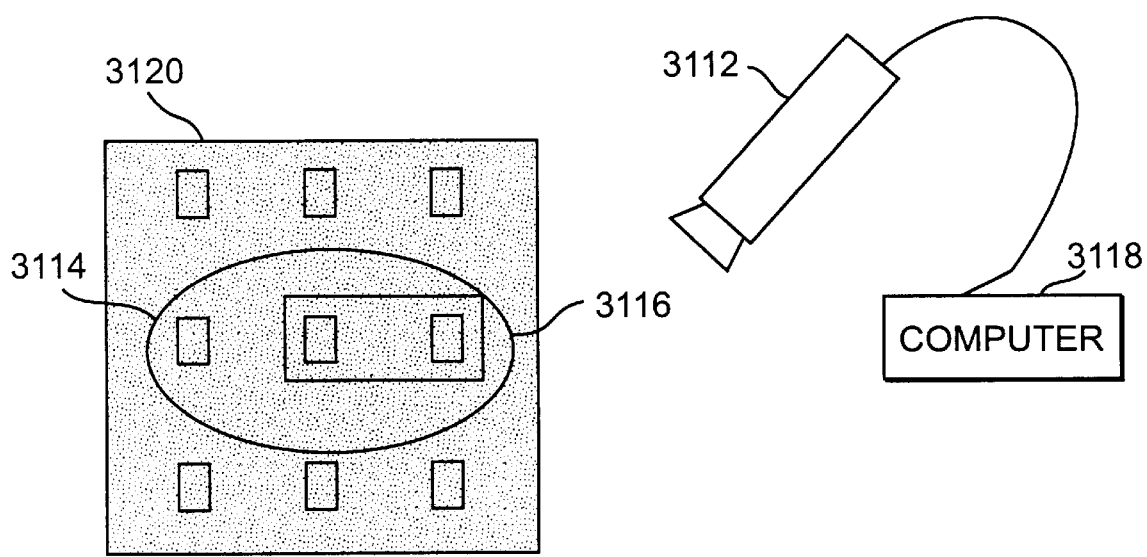
FIG. 31 is a block diagram showing glyph address carpet image capture based on selection using a highlighted area.

FIG. 31 is a block diagram that illustrates a glyph address carpet 3120, which can be read by a pan and zoom camera 3112. The captured portion of glyph address carpet 3120 can then be processed by computer 3118. Camera 3112 scans glyph address carpet 3120 for highlighted area 3116, and captures the portion of the glyph address carpet in the area defined by highlighting 3116. Highlighting 3116 could be any type of highlighting. For example, highlighting 3116 could be a color, a distinctive border, or even a checkmark or other type of handmade mark. Alternatively, or additionally, camera 3112 could capture wide area 3114 for processing in response to the selection.

Similarly, in one embodiment, device 3112 is a document image scanner that captures the image of a document having an address carpet graphical user interface image marked for selection (e.g., check, circle, highlight). The marks are recognizable by conventional techniques of image processing (e.g., color, black, white).

J. Conclusion

Methods, systems and articles of manufacture consistent with the present invention therefore facilitate implementation of a graphical user interface using glyph address carpets. The foregoing description of an implementation of the invention has been presented for purposes of illustration and description. It is not exhaustive and does not limit the invention to the precise form disclosed. Modifications and variations are possible in light of the above teachings or may be acquired from practicing of the invention.

What is claimed is:

1. An apparatus for decoding an image, comprising:
   means for determining an orientation of a captured image of two-dimensional address codes, further comprising:
      means for developing a correlation indicating the orientation of a matrix associated with the image relative to an orientation of the two-dimensional address codes; and
   means for translating the two dimensional address codes in accordance with the orientation of the image into a discrete pointer.

2. The apparatus according to claim 1, further comprising:
   means for decoding a function corresponding to the discrete image pointer.

3. The apparatus according to claim 1, wherein the means for determining an orientation comprises
   means for forming a first set of two-dimensional address codes based on the captured image; and
   means for forming a second set of two-dimensional address codes based on the first set.

4. The apparatus according to claim 3, wherein the means for determining an orientation further comprises
   means for determining a first correlation based on the first set;
   means for determining a second correlation based on the second set; and
   means for selecting the first set or the second set based on the first and second correlations.

5. The apparatus according to claim 4, wherein the means for determining a first correlation comprises
   means for determining a third correlation based on even rows of the first set of two-dimensional address codes; and means for determining a fourth correlation based on odd rows of the first set of two-dimensional address codes.

6. The apparatus according to claim 4, wherein the means for determining a second correlation comprises means for determining a third correlation based on even rows of the second set of two-dimensional address codes; and means for determining a fourth correlation based on odd rows of the second set of two-dimensional address codes.

7. The apparatus according to claim 1, wherein the means for determining an orientation comprises:

means for determining a set of two-dimensional address codes having either a first or second orientation; and means for determining whether the orientation of the set of two-dimensional address codes is the first or second orientation.

8. The apparatus according to claim 7, wherein the means for determining whether the orientation of the set of two-dimensional address codes is the first or second orientation comprises means for performing a majority vote across even rows of the set of two-dimensional address codes; and means for performing a majority vote across odd rows of the set of two-dimensional address codes.

9. The apparatus according to claim 7, wherein the means for determining whether the orientation of the set of two-dimensional address codes is the first or second orientation comprises means for performing a first correlation on the set of two-dimensional address codes; and means for performing a second correlation on the set of two-dimensional address codes; and wherein the means for translating comprises means for determining the discrete pointer based on the first and second correlation.

10. The apparatus according to claim 9, wherein the means for performing the first correlation comprises means for performing a third correlation based on the even rows of the set of two-dimensional address codes; and means for performing a fourth correlation based on the even rows of the set of two-dimensional address codes; and wherein the means for performing the second correlation comprises means for performing a fifth correlation based on odd rows of the set of two-dimensional address codes; and means for performing a sixth correlation based on the odd rows of the set of two-dimensional address codes.

11. The apparatus according to claim 9, wherein at least one of the first or second correlations comprises means for correlating a known code sequence and the set of two-dimensional address codes.

12. The apparatus according to claim 11, wherein the means for correlating a known code sequence comprises means for performing a majority vote on the set of two dimensional address codes; and means for correlating the known code sequence and the majority vote.

13. A method for decoding an image, comprising:

determining an orientation of a captured image of two-dimensional address codes, further comprising:

means for developing a correlation indicating the orientation of a matrix associated with the image relative to an orientation of the two-dimensional address codes; and translating the two dimensional address codes in accordance with the orientation of the image into a discrete pointer.

14. The method according to claim 13, further including:

decoding a function corresponding to the discrete image pointer.

15. The method according to claim 13, wherein the step of determining an orientation includes forming a first set of two-dimensional address codes based on the captured image; and forming a second set of two-dimensional address codes based on the first set.

16. The method according to claim 15, wherein the step of determining an orientation further includes determining a first correlation based on the first set;

determining a second correlation based on the second set; and selecting the first set or the second set based on the first and second correlations.

17. The method according to claim 16, wherein the step of determining a first correlation includes determining a third correlation based on even rows of the first set of two-dimensional address codes; and determining a fourth correlation based on odd rows of the first set of two-dimensional address codes.

18. The method according to claim 16, wherein the step of determining a second correlation includes determining a third correlation based on even rows of the second set of two-dimensional address codes; and determining a fourth correlation based on odd rows of the second set of two-dimensional address codes.

19. The method according to claim 13, wherein the step of determining an orientation includes determining a set of two-dimensional address codes having either a first or second orientation; and determining whether the orientation of the set of two-dimensional address codes is the first or second orientation.

20. The method according to claim 19, wherein the step of determining whether the orientation of the set of two-dimensional address codes is the first or second orientation includes performing a majority vote across even rows of the set of two-dimensional address codes; and performing a majority vote across odd rows of the set of two-dimensional address codes.

21. The method according to claim 19, wherein the step of determining whether the orientation of the set of two-dimensional address codes is the first or second orientation includes performing a first correlation on the set of two-dimensional address codes; and performing a second correlation on the set of two-dimensional address codes; and wherein the step of translating includes determining the discrete pointer based on the first and second correlation.

22. The method according to claim 21, wherein the step of performing the first correlation includes performing a third correlation based on the even rows of the set of two-dimensional address codes; and performing a fourth correlation based on the even rows of the set of two-dimensional address codes; and wherein the step of performing the second correlation includes performing a fifth correlation based on odd rows of the set of two-dimensional address codes; and performing a sixth correlation based on the odd rows of the set of two-dimensional address codes.

23. The method according to claim 21, wherein at least one of the first or second correlations includes correlating a known code sequence and the set of two-dimensional address codes.

24. The method according to claim 23, wherein the step of correlating a known code sequence includes performing a majority vote on the set of two dimensional address codes; and correlating the known code sequence and the majority vote.

25. An apparatus for decoding an image, comprising:

means for determining an orientation of a captured image of two-dimensional address codes, further comprising:

means for developing a correlation indicating whether a matrix associated with the image is oriented at either of 0° or 180° relative to an orientation of the two-dimensional address codes; and means for translating the two dimensional address codes in accordance with the orientation of the image into a discrete pointer.

26. The apparatus according to claim 25, further comprising:

means for decoding a function corresponding to the discrete image pointer.

27. The apparatus according to claim 25, wherein the means for determining an orientation comprises:

means for forming a first set of two-dimensional address codes based on the captured image; and means for forming a second set of two-dimensional address codes based on the first set.

28. The apparatus according to claim 27, wherein the means for determining an orientation further comprises:

means for determining a first correlation based on the first set;

means for determining a second correlation based on the second set; and means for selecting the first set or the second set based on the first and second correlations.

29. The apparatus according to claim 28, wherein the means for determining a first correlation comprises:

means for determining a third correlation based on even rows of the first set of two-dimensional address codes; and means for determining a fourth correlation based on odd rows of the first set of two-dimensional address codes.

30. The apparatus according to claim 28, wherein the means for determining a second correlation comprises:

means for determining a third correlation based on even rows of the second set of two-dimensional address codes; and means for determining a fourth correlation based on odd rows of the second set of two-dimensional address codes.

31. The apparatus according to claim 25, wherein the means for determining an orientation comprises:

means for determining a set of two-dimensional address codes having either a first or second orientation; and means for determining whether the orientation of the set of two-dimensional address codes is the first or second orientation.

32. The apparatus according to claim 31, wherein the means for determining whether the orientation of the set of two-dimensional address codes is the first or second orientation comprises:

means for performing a majority vote across even rows of the set of two-dimensional address codes; and means for performing a majority vote across odd rows of the set of two-dimensional address codes.

33. The apparatus according to claim 31, wherein the means for determining whether the orientation of the set of two-dimensional address codes is the first or second orientation comprises:

means for performing a first correlation on the set of two-dimensional address codes; and means for performing a second correlation on the set of two-dimensional address codes; and wherein the means for translating comprises means for determining the discrete pointer based on the first and second correlation.

34. The apparatus according to claim 33, wherein the means for performing the first correlation comprises:

means for performing a third correlation based on the even rows of the set of two-dimensional address codes; and means for performing a fourth correlation based on the even rows of the set of two-dimensional address codes; and wherein the means for performing the second correlation comprises means for performing a fifth correlation based on odd rows of the set of two-dimensional address codes; and means for performing a sixth correlation based on the odd rows of the set of two-dimensional address codes.

35. The apparatus according to claim 33, wherein at least one of the first or second correlations comprises:

means for correlating a known code sequence and the set of two-dimensional address codes.

36. The apparatus according to claim 35, wherein the means for correlating a known code sequence comprises means for performing a majority vote on the set of two dimensional address codes; and means for correlating the known code sequence and the majority vote.

37. A method for decoding an image, comprising:

determining an orientation of a captured image of two-dimensional address codes by developing a correlation indicating whether a matrix associated with the image is oriented at either of 0° or 180° relative to an orientation of the two-dimensional address codes; and translating the two dimensional address codes in accordance with the orientation of the image into a discrete pointer.

38. The method according to claim 37, further including:

decoding a function corresponding to the discrete image pointer.

39. The method according to claim 37, wherein the step of determining an orientation includes:

forming a first set of two-dimensional address codes based on the captured image; and forming a second set of two-dimensional address codes based on the first set.

40. The method according to claim 39, wherein the step of determining an orientation further includes:

determining a first correlation based on the first set;

determining a second correlation based on the second set; and selecting the first set or the second set based on the first and second correlations.

41. The method according to claim 39, wherein the step of determining a first correlation includes:

determining a third correlation based on even rows of the first set of two-dimensional address codes; and determining a fourth correlation based on odd rows of the first set of two-dimensional address codes.

42. The method according to claim 40, wherein the step of determining a second correlation includes:

determining a third correlation based on even rows of the second set of two-dimensional address codes; and determining a fourth correlation based on odd rows of the second set of two-dimensional address codes.

43. The method according to claim 37, wherein the step of determining an orientation includes:

determining a set of two-dimensional address codes having either a first or second orientation; and determining whether the orientation of the set of two-dimensional address codes is the first or second orientation.

44. The method according to claim 43, wherein the step of determining whether the orientation of the set of two-dimensional address codes is the first or second orientation includes:

performing a majority vote across even rows of the set of two-dimensional address codes; and performing a majority vote across odd rows of the set of two-dimensional address codes.

45. The method according to claim 43, wherein the step of determining whether the orientation of the set of two-dimensional address codes is the first or second orientation includes:

performing a first correlation on the set of two-dimensional address codes; and performing a second correlation on the set of two-dimensional address codes; and wherein the step of translating includes determining the discrete pointer based on the first and second correlation.

46. The method according to claim 45, wherein the step of performing the first correlation includes:

performing a third correlation based on the even rows of the set of two-dimensional address codes; and performing a fourth correlation based on the even rows of the set of two-dimensional address codes; and wherein the step of performing the second correlation includes performing a fifth correlation based on odd rows of the set of two-dimensional address codes; and performing a sixth correlation based on the odd rows of the set of two-dimensional address codes.

47. The method according to claim 45, wherein at least one of the first or second correlations includes:

correlating a known code sequence and the set of two-dimensional address codes.

48. The method according to claim 47, wherein the step of correlating a known code sequence includes:

performing a majority vote on the set of two dimensional address codes; and correlating the known code sequence and the majority vote.

* * * * *